(12) United States Patent
Yonemaru

(10) Patent No.: US 12,444,745 B2
(45) Date of Patent: Oct. 14, 2025

(54) SHAPING MATERIAL FOR ELECTRODE, ELECTRODE AND METHODS OF PRODUCING AND RECYCLING SAME, AND ELECTROCHEMICAL DEVICE

(71) Applicant: ZEON CORPORATION, Tokyo (JP)

(72) Inventor: Hiroyuki Yonemaru, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 660 days.

(21) Appl. No.: 17/593,863

(22) PCT Filed: Mar. 30, 2020

(86) PCT No.: PCT/JP2020/014665
§ 371 (c)(1),
(2) Date: Sep. 27, 2021

(87) PCT Pub. No.: WO2020/203997
PCT Pub. Date: Oct. 8, 2020

(65) Prior Publication Data
US 2022/0166020 A1 May 26, 2022

(30) Foreign Application Priority Data
Mar. 29, 2019 (JP) .................. 2019-068353

(51) Int. Cl.
*H01M 4/583* (2010.01)
*H01M 4/66* (2006.01)
*H01M 4/86* (2006.01)
*H01M 10/0525* (2010.01)
*H01M 50/409* (2021.01)

(52) U.S. Cl.
CPC .......... *H01M 4/583* (2013.01); *H01M 4/662* (2013.01); *H01M 4/8673* (2013.01); *H01M 10/0525* (2013.01); *H01M 50/409* (2021.01)

(58) Field of Classification Search
CPC .... H01M 4/583; H01M 50/409; H01M 4/662; H01M 4/8673; H01M 10/0525
See application file for complete search history.

(56) References Cited

U.S. PATENT DOCUMENTS

| | | | |
|---|---|---|---|
| 6,299,653 B1 * | 10/2001 | Hoshi | H01M 10/05 429/300 |
| 7,700,018 B2 | 4/2010 | Lavoie et al. | |
| 10,886,560 B2 | 1/2021 | Kim et al. | |
| 10,971,753 B2 * | 4/2021 | Lee | H01M 50/491 |
| 2001/0053485 A1 | 12/2001 | Shibuya et al. | |
| 2003/0091904 A1 * | 5/2003 | Munshi | H01M 4/137 429/315 |
| 2003/0215710 A1 | 11/2003 | Lavoie et al. | |
| 2006/0263688 A1 | 11/2006 | Guyomard et al. | |
| 2015/0270572 A1 * | 9/2015 | Hayano | H01M 50/491 525/403 |
| 2018/0198127 A1 * | 7/2018 | Oguro | H01M 10/0562 |
| 2020/0358099 A1 * | 11/2020 | Nakano | H01M 10/0566 |

FOREIGN PATENT DOCUMENTS

| | | | | |
|---|---|---|---|---|
| JP | 2000058078 A | * | 2/2000 | |
| JP | 2005519442 A | | 6/2005 | |
| JP | 2006216373 A | | 8/2006 | |
| JP | 2006522441 A | | 9/2006 | |
| JP | 2010086788 A | * | 4/2010 | |
| JP | 4593114 B2 | | 12/2010 | |
| JP | 2011060558 A | | 3/2011 | |
| JP | 2011210413 A | | 10/2011 | |
| JP | 2018073723 A | | 5/2018 | |
| KR | 1020170092262 A | | 8/2017 | |
| WO | 2013128936 A1 | | 9/2013 | |
| WO | WO-2015151144 A1 | * | 10/2015 | ........ H01M 10/0525 |
| WO | WO-2017043379 A1 | * | 3/2017 | ........ H01M 10/0562 |
| WO | WO-2019074030 A1 | * | 4/2019 | ........ H01M 10/0525 |

OTHER PUBLICATIONS

English Machine Translation JP 2000058078 A (Year: 2000).*
English Machine Translation JP 2010086788 A (Year: 2010).*
English Machine Translation WO 2015/151144 A1 (Year: 2015).*
English Machine Translation WO 2017/043379 A1 (Year: 2017).*
English Machine Translation for WO-2017043379-A1 (Year: 2017).*

(Continued)

*Primary Examiner* — Matthew T Martin
*Assistant Examiner* — Katherine N Higgins
(74) *Attorney, Agent, or Firm* — KENJA IP LAW PC

(57) ABSTRACT

Provided is a shaping material for an electrode that is easy to produce, in which the proportional content of an active material is easy to improve, and with which problems of odor and stability have a low tendency to occur. The shaping material for an electrode contains at least one active material (A) and a viscous electrolyte composition. The viscous electrolyte composition contains: at least one ionic material (S); and an organic composition (P—O) containing at least one polymer (P) and a low molecular weight organic compound (O) having a molecular weight of less than 10,000. The proportional content of the polymer (P) in the organic composition (P—O) is 50 mass % or less. The proportion constituted by a compound having an equal or higher volatilization rate than N-methylpyrrolidone among the low molecular weight organic compound (O) is not less than 0 mass % and not more than 20 mass %.

27 Claims, No Drawings

(56) References Cited

OTHER PUBLICATIONS

English Machine Translation for JP-2000058078-A (Year: 2000).*
English Machine Translation for WO-2019074030-A1 (Year: 2019).*
English Machine Translation for JP-2010086788-A (Year: 2010).*
English Machine Translation for WO-2015151144-A1 (Year: 2015).*
Jun. 30, 2020, International Search Report issued in the International Patent Application No. PCT/JP2020/014665.
Sep. 28, 2021, International Preliminary Report on Patentability issued in the International Patent Application No. PCT/JP2020/014665.

* cited by examiner

SHAPING MATERIAL FOR ELECTRODE, ELECTRODE AND METHODS OF PRODUCING AND RECYCLING SAME, AND ELECTROCHEMICAL DEVICE

TECHNICAL FIELD

The present disclosure relates to a shaping material for an electrode, an electrode, a method of producing an electrode, a method of recycling an electrode, and an electrochemical device.

BACKGROUND

Electrodes containing active materials are used in electrochemical devices such as primary batteries (lithium primary batteries, etc.), non-aqueous secondary batteries (lithium ion secondary batteries, lithium metal secondary batteries, sodium ion secondary batteries, potassium ion secondary batteries, magnesium secondary batteries, aluminum secondary batteries, etc.), solar cells (dye-sensitized solar cells, etc.), capacitors (electric double-layer capacitors, lithium ion capacitors, etc.), electrochromic display devices, electrochemical light-emitting elements, electric double-layer transistors, and electrochemical actuators.

For example, in Patent Literature (PTL) 1, a positive electrode for an alkali metal polymer battery that includes a positive electrode film on metal foil is produced by using a screw extruder to mix an ion conducting polymer electrolyte material such as polyethylene oxide, a cathode active material such as vanadium oxide, a conductive filler such as carbon and graphite particles, a lithium salt, and a plasticizer and to extrude the mixture onto the metal foil.

As another example, a positive electrode for a lithium battery that includes an electrode film on aluminum foil is produced in PTL 2 by applying a viscous solution containing polyethylene oxide, carbon, $LiV_3O_8$, ethylene carbonate, propylene carbonate, a PVdF-HFP copolymer (copolymer of polyvinylidene fluoride and hexafluoropropylene), and acrylonitrile onto the aluminum foil and subsequently causing evaporation of acrylonitrile.

CITATION LIST

Patent Literature

PTL 1: JP2005-519442A
PTL 2: JP2006-522441A

SUMMARY

Technical Problem

However, the technique described in PTL 1 suffers from problems in terms that it is difficult to mix ingredients of the positive electrode film and it is difficult to improve the proportional content of the active material.

The technique described in PTL 2 also suffers from problems in terms that volatilization of a large amount of a volatile solvent such as acrylonitrile during formation of the electrode film may result in problems such as odor and in terms that it is difficult to cause volatilization of the volatile solvent to proceed with perfect consistency when multiple electrodes are produced, and thus it is difficult to stably produce electrodes having stable performance.

Accordingly, one object of the present disclosure is to provide a shaping material for an electrode that is easy to produce, in which the proportional content of an active material is easy to improve, and with which problems of odor and stability have a low tendency to occur.

Another object of the present disclosure is to provide an electrode and an electrochemical device in which this shaping material for an electrode is used.

Solution to Problem

As a result of diligent investigation conducted to achieve the objects set forth above, the inventor discovered that a shaping material for an electrode containing a specific viscous electrolyte composition is easy to produce, enables easy improvement of the proportional content of an active material, and has a low tendency to suffer from problems of odor and stability, and, in this manner, the inventor completed the present disclosure.

Specifically, the present disclosure aims to advantageously solve the problems set forth above, and a presently disclosed shaping material for an electrode comprises: at least one active material (A); and a viscous electrolyte composition, wherein the viscous electrolyte composition contains: at least one ionic material (S); and an organic composition (P—O) containing at least one polymer (P) and a low molecular weight organic compound (O) having a molecular weight of less than 10,000, proportional content of the polymer (P) in the organic composition (P—O) is 50 mass % or less, and a proportion constituted by a compound having an equal or higher volatilization rate than N-methylpyrrolidone among the low molecular weight organic compound (O) is not less than 0 mass % and not more than 20 mass %. By using a viscous electrolyte composition containing an organic composition (P—O) that contains a low molecular weight organic compound (O) and in which the proportional content of a polymer (P) is 50 mass % or less in this manner, the obtained shaping material for an electrode is easy to produce and enables easy improvement of the proportional content of an active material. Moreover, through the proportion constituted by a compound having an equal or higher volatilization rate than N-methylpyrrolidone among the low molecular weight organic compound (O) being 20 mass % or less, the occurrence of problems of odor and stability during production can be inhibited.

Note that the "volatilization rate" referred to in the present disclosure can be measured at a temperature of 18° C. by a method described in a reference example.

The presently disclosed shaping material for an electrode preferably further comprises a conductive filler. The inclusion of a conductive filler makes it possible to form an electrode having excellent electrical conductivity.

In the presently disclosed shaping material for an electrode, the low molecular weight organic compound (O) preferably includes at least two compounds having a lower volatilization rate than N-methylpyrrolidone. The inclusion of at least two compounds having a lower volatilization rate than N-methylpyrrolidone as the low molecular weight organic compound (O) makes it easier to dissolve an ionic material.

In the presently disclosed shaping material for an electrode, proportional content of the active material (A) is preferably 50 volume % or more, and more preferably 60 volume % or more. When the proportional content of the active material (A) is not less than any of the lower limits set forth above, it is possible to produce a high-capacity electrochemical device.

In the presently disclosed shaping material for an electrode, the active material (A) is preferably of a nanosize.

When the active material (A) is of a nanosize, it is possible to form an electrode having excellent strength and to cause good progression of an electrochemical reaction.

The presently disclosed shaping material for an electrode preferably further comprises a fiber component having a fiber diameter that is of a nanosize. The inclusion of a fiber component having a fiber diameter that is of a nanosize makes it possible to increase the strength of an electrode that is formed using the shaping material for an electrode.

In the presently disclosed shaping material for an electrode, proportional content of a compound that is a liquid at a temperature of 5° C. under atmospheric pressure in the organic composition (P—O) is preferably not less than 0 mass % and not more than 20 mass %. By using an organic composition (P—O) in which the proportional content of a compound that is a liquid at a temperature of 5° C. under atmospheric pressure is within the range set forth above, it is possible to obtain a shaping material for an electrode that is difficult to combust.

In the presently disclosed shaping material for an electrode, the viscous electrolyte composition preferably has an ion conductivity at a temperature of 35° C. of $1.0 \times 10^{-4}$ S/cm or more.

Moreover, the viscous electrolyte composition preferably has an ion conductivity at a temperature of −20° C. of $1.0 \times 10^{-4}$ S/cm or more.

When the ion conductivity of the viscous electrolyte composition is not less than the lower limit set forth above, it is possible to cause good progression of an electrochemical reaction in an electrochemical device.

Note that the "ion conductivity" referred to in the present disclosure is ion conductivity measured by an alternating current method and can be determined as the reciprocal of volume resistivity calculated from the arc diameter of a Nyquist plot that is obtained by sandwiching a sample between two parallel electrode plates made of stainless steel inside a thermostatic tank controlled to the measurement temperature ±1° C. and then applying alternating current within a range of 10 mV to 100 mV.

Moreover, the present disclosure aims to advantageously solve the problems set forth above, and a presently disclosed electrode comprises a portion formed using any one of the shaping materials for an electrode set forth above. By using the shaping material for an electrode set forth above, it is possible to obtain an electrode having a high proportional content of an active material while inhibiting the occurrence of problems of odor and stability.

In the presently disclosed electrode, the portion preferably has a porosity of 20 volume % or less. When the porosity of the portion formed using the shaping material for an electrode is 20 volume % or less, it is possible to cause good progression of an electrochemical reaction.

Note that the "porosity" referred to in the present disclosure can be determined by calculating the proportion by which actual specific gravity deviates from theoretical specific gravity at a temperature of 25° C.(={(theoretical specific gravity−actual specific gravity)/theoretical specific gravity}×100%).

The presently disclosed electrode is preferably obtained through film formation of any one of the shaping materials for an electrode set forth above in a sheet shape. Since bonding is maintained only through physical affinity in the presently disclosed electrode, it is easier to maintain close adherence with an adherend such as a current collector in the case of a sheet shape that can easily copy the shape of the adherend.

The presently disclosed electrode is preferably obtained by affixing the shaping material for an electrode set forth above to a current collector.

In the presently disclosed electrode, the current collector preferably includes a through hole at a site where the shaping material for an electrode is affixed. The inclusion of a through hole in the current collector can improve ion conductivity of the electrode and makes it possible to affix the shaping material for an electrode well at a position where the through hole is present. The inclusion of a through hole in the current collector also facilitates pre-doping.

In the presently disclosed electrode, the current collector preferably has a conductive coating at a surface that is in contact with the shaping material for an electrode. When the current collector has a conductive coating, electrical conductivity of the electrode can be increased, and close adherence with the shaping material for an electrode can be increased through surface irregularities.

In the presently disclosed electrode, the shaping material for an electrode is preferably cross-linked or polymerized. Cross-linking or polymerization of the shaping material for an electrode makes it possible to obtain an electrode having high strength.

Furthermore, the present disclosure aims to advantageously solve the problems set forth above, and a presently disclosed method of producing an electrode preferably comprises a step of squashing a plurality of strands formed of any one of the shaping materials for an electrode set forth above to shape the plurality of strands into a sheet shape. By squashing a plurality of strands formed of the shaping material for an electrode, a sheet formed of the shaping material for an electrode can easily be obtained through less pressing force, and thinning of the sheet is facilitated.

The presently disclosed method of producing an electrode preferably comprises a step of performing forming of any one of the shaping materials for an electrode set forth above and subsequently affixing the shaping material for an electrode to a current collector. By performing forming of the shaping material for an electrode and subsequently affixing the shaping material for an electrode to a current collector, the shape of a portion that is formed of the shaping material for an electrode can easily be adjusted to a desired shape.

The presently disclosed method of producing an electrode preferably comprises a step of affixing any one of the shaping materials for an electrode set forth above to both sides of a current collector.

The presently disclosed method of producing an electrode preferably comprises a step of squashing any one of the shaping materials for an electrode set forth above using a curved surface having a radius of curvature of 100 mm or less. By using a curved surface having a radius of curvature of 100 mm or less to perform squashing, the thickness of a portion that is formed of the shaping material for an electrode can easily be adjusted.

The presently disclosed method of producing an electrode preferably comprises a step of paring any one of the shaping materials for an electrode set forth above to adjust either or both of thickness and shape. By paring the shaping material for an electrode, a portion that is formed of the shaping material for an electrode can easily be adjusted to a desired thickness and/or shape.

The presently disclosed method of producing an electrode preferably comprises a step of performing rough adjustment of thickness of any one of the shaping materials for an electrode set forth above and subsequently performing fine adjustment using a curved surface having a radius of curvature of 0.5 mm or more. By performing rough adjustment of the thickness of a portion formed of the shaping material for an electrode and subsequently performing fine adjustment thereof using a curved surface having a radius of curvature of 0.5 mm or more, it is possible to control the thickness with a high degree of accuracy.

The presently disclosed method of producing an electrode preferably comprises a step of measuring thickness of the shaping material for an electrode and performing feedback control of basis weight of the shaping material for an electrode. By measuring the thickness of the shaping material for an electrode and performing feedback control of basis weight, this makes it easy to control the basis weight. Note that the basis weight can easily be determined from the thickness because, in the shaping material for an electrode set forth above, the proportion constituted by a compound having an equal or higher volatilization rate than N-methylpyrrolidone is not less than 0 mass % and not more than 20 mass %.

Also, the present disclosure aims to advantageously solve the problems set forth above, and a presently disclosed method of recycling an electrode comprises a step of peeling a shaping material for an electrode from a current collector. By peeling the shaping material for an electrode from an electrode in which a portion formed of the shaping material for an electrode is disposed on a current collector in this manner, the electrode can easily be reused.

Moreover, the present disclosure aims to advantageously solve the problems set forth above, and a presently disclosed electrochemical device comprises any one of the electrodes set forth above. The inclusion of the electrode set forth above makes it possible to display good electrochemical characteristics.

In the presently disclosed electrochemical device, a counter electrode of the electrode is preferably formed of at least one selected from an alkali metal, an alkaline earth metal, and metal aluminum. By using a counter electrode formed of at least one of an alkali metal, an alkaline earth metal, and metal aluminum, imported moisture originating from the electrode can be trapped well.

In the presently disclosed electrochemical device, either or both of a counter electrode of the electrode and a separator preferably contain an inorganic filler having moisture trapping ability. When an inorganic filler having moisture trapping ability is included, imported moisture originating from the electrode can be trapped well.

In the presently disclosed electrochemical device, either or both of a counter electrode of the electrode and a separator preferably contain an ionic material having moisture trapping ability. When an ionic material having moisture trapping ability is included, imported moisture originating from the electrode can be trapped well.

Advantageous Effect

According to the present disclosure, it is possible to provide a shaping material for an electrode that is easy to produce, in which the proportional content of an active material is easy to improve, and with which problems of odor and stability have a low tendency to occur.

Moreover, according to the present disclosure, it is possible to provide an electrode and an electrochemical device in which this shaping material for an electrode is used.

DETAILED DESCRIPTION

The presently disclosed shaping material for an electrode can be used without any specific limitations in formation of an electrode of an electrochemical device such as a primary battery (lithium primary battery, etc.), a non-aqueous secondary battery (lithium ion secondary battery, lithium metal secondary battery, sodium ion secondary battery, potassium ion secondary battery, magnesium secondary battery, aluminum secondary battery, etc.), a solar cell (dye-sensitized solar cell, etc.), a capacitor (electric double-layer capacitor, lithium ion capacitor, etc.), an electrochromic display device, an electrochemical light-emitting element, an electric double-layer transistor, or an electrochemical actuator, for example.

Moreover, the presently disclosed electrode is an electrode in which the presently disclosed shaping material for an electrode is used and can be produced using the presently disclosed method of producing an electrode, but is not specifically limited to being produced thereby. Furthermore, the presently disclosed electrode can be recycled using the presently disclosed method of recycling an electrode.

Also, the presently disclosed electrochemical device includes the presently disclosed electrode.

Note that the aforementioned electrochemical device is preferably a non-aqueous secondary battery, and is more preferably a lithium ion secondary battery.

Shaping Material for Electrode

The presently disclosed shaping material for an electrode contains at least one active material (A) and a viscous electrolyte composition. The viscous electrolyte composition contains at least one ionic material (S) and an organic composition (P—O) containing at least one polymer (P) and a low molecular weight organic compound (O) having a molecular weight of less than 10,000. The shaping material for an electrode can optionally further contain one or more selected from the group consisting of a conductive filler, a solid electrolyte, a fiber component, and an additive.

Active Material (A)

Any active material in accordance with the type of electrochemical device can be used as the active material (A) without any specific limitations. The active material (A) contained in the shaping material for an electrode may be composed of just one active material or may be a mixture of two or more active materials.

In particular, the active material (A) is preferably an active material of a nanosize (maximum diameter of less than 1 μm), and is more preferably an active material having a volume-average particle diameter of not less than 100 nm and not more than 900 nm. The use of a nanosize active material increases contact interface area with the viscous electrolyte composition, which makes it possible to form an electrode having excellent strength and to form an electrode that can cause good progression of an electrochemical reaction.

Note that the volume-average particle diameter of an active material referred to in the present disclosure can be measured in accordance with JIS K8825.

The proportional content of the active material (A) in the shaping material for an electrode is preferably 50 volume % or more, and more preferably 60 volume % or more. When the proportional content of the active material (A) is not less than any of the lower limits set forth above, it is possible to form an electrode that enables production of a high-capacity electrochemical device.

Viscous Electrolyte Composition

The viscous electrolyte composition is a composition that is viscous and contains at least one ionic material (S) and an organic composition (P—O) containing at least one polymer (P) and a low molecular weight organic compound (O) having a molecular weight of less than 10,000. Requirements placed on the viscous electrolyte composition are that the proportional content of the polymer (P) in the organic composition (P—O) is 50 mass % or less and that the proportion constituted by a compound having an equal or higher volatilization rate than N-methylpyrrolidone among the low molecular weight organic compound (O) is not less than 0 mass % and not more than 20 mass %.

Through the inclusion of the low molecular weight organic compound (O) and through the proportional content of the polymer (P) in the organic composition (P—O) being 50 mass % or less in this manner, it becomes easy to mix the active material (A) and the viscous electrolyte composition. Consequently, the obtained shaping material for an electrode is easy to produce and the proportional content of the active material in the shaping material for an electrode is easy to improve. Moreover, through the proportion constituted by a compound having an equal or higher volatilization rate than N-methylpyrrolidone among the low molecular weight organic compound (O) being 20 mass % or less, the occurrence of problems of odor and stability during production can be inhibited while enabling easy production.

Ionic Material (S)

Any ionic material in accordance with the type of ion that is used in an electrochemical reaction in an electrochemical device can be used as the ionic material.

The ionic material (S) is preferably a material that is miscible with the organic composition (P—O). As a result of being miscible, good ion conductivity can be displayed.

The ionic material (S) is preferably a material that is strongly resistant to moisture. Moreover, the ionic material is preferably a salt having a bis(fluorosulfonyl)imide anion, a bis(trifluoromethanesulfonyl)imide anion, a bis(oxalato)borate anion, a difluoro(oxalato)borate anion, $ClO_4^-$, $NO_3^-$, $BF_4^-$, $I^-$, $I_3^-$, or the like as an anion, and more preferably a salt having a bis(oxalato)borate anion or a difluoro(oxalato)borate anion as an anion, but is not specifically limited thereto.

More specifically, in a case in which the electrochemical device is a lithium ion secondary battery, a lithium ion capacitor, or the like, a lithium salt of any of the anions described above can be used as the ionic material. Moreover, in a case in which the electrochemical device is a magnesium secondary battery or the like, a magnesium salt of any of the anions described above can be used as the ionic material.

In particular, the inclusion of a polyvalent cation is preferable from a viewpoint of increasing the electrode strength. When a polyvalent cation is included, pseudo-cross-links can be formed with the polymer (P).

One of these ionic materials may be used individually, or two or more of these ionic materials may be used together.

The concentration of the ionic material (S) in the viscous electrolyte composition can be set as not less than 0.01 mol/L and less than 2.5 mol/L, for example.

Note that since $LiPF_6$ reacts with atmospheric moisture to produce hydrofluoric acid and thus may cause corrosion of production equipment and loss of performance of an electrochemical device, the amount of $LiPF_6$ that is contained as the ionic material (S) is preferably small, and the proportional content of $LiPF_6$ in the shaping material for an electrode is preferably 5 mass % or less, and more preferably 3 mass % or less.

Organic Composition (P—O)

The organic composition (P—O) contains at least one polymer (P) in a proportion of 50 mass % or less and also contains a low molecular weight organic compound (O) having a molecular weight of less than 10,000.

Polymer (P)

The polymer (P) can be a polymer such as a polyether polymer, an acrylic polymer, a polyacrylonitrile polymer, a polyacrylamide polymer, a polyoxazoline polymer, an aliphatic polycarbonate polymer, or the like without any specific limitations. Specifically, the polymer (P) may be polyethylene oxide, an ethylene oxide copolymer, a side chain ethylene oxide polymer, hydrin rubber, polytrimethylene ether, polytetramethylene ether, polyvinyl acetate, a vinyl chloride-vinyl acetate copolymer, polyoxazoline, poly(2-ethyl-oxazoline), a side chain oxazoline copolymer, polyacrylonitrile, nitrile rubber, an acrylic acid ester copolymer, polymethyl methacrylate, a styrene-acrylate copolymer, acrylic rubber, poly(N-vinylacetamide), or polyethylene carbonate. One of these polymers may be used individually, or two or more of these polymers may be used together.

The weight-average molecular weight of the polymer (P) as measured in accordance with JIS K7252 is preferably 10,000 or more, and is preferably not less than 100,000 and not more than 30,000,000. Note that the polymer (P) is not inclusive of a material that becomes a polymer through polymerization inside an electrochemical device.

In particular, the polymer (P) is preferably a polymer that dissolves in a mixture of the ionic material (S) and the low molecular weight organic compound (O). Specifically, the polymer (P) is preferably a polymer that when added to a liquid mixture containing the ionic material (S) and the low molecular weight organic compound (O) in the same ratio as in the viscous electrolyte composition, causes an increase of viscosity of this liquid mixture. Note that in a case in which a mixture of the ionic material (S) and the low molecular weight organic compound (O) is a solid at room temperature, the liquid mixture can be produced through heating of the mixture.

Moreover, from a viewpoint of dissolving well in the viscous electrolyte composition, a high molecular weight component of the polymer (P) preferably has low gel content. The gel content is preferably 20 mass % or less, more preferably 10 mass % or less, and even more preferably 5 mass % or less among the polymer (P). The gel content of the polymer (P) can be determined by adding the polymer to propylene carbonate in a ratio of 5 mass %, dissolving the polymer under stirring at 100° C. for 12 hours, filtering off insoluble content at 100° C. using a membrane filter, vacuum drying the insoluble content to remove propylene carbonate, and measuring the residue weight.

The proportional content of the polymer (P) in the organic composition (P—O) is required to be 50 mass % or less, is preferably 1 mass % or more, and more preferably 3 mass % or more, and is preferably 30 mass % or less. When the proportional content of the polymer (P) is 50 mass % or less, the active material (A) and the viscous electrolyte composition can be mixed well even in a situation in which the active material (A) constitutes a high proportion (for example, 70 mass % or more) in the resultant shaping material for an electrode. Moreover, when the proportional content of the polymer (P) is not more than any of the upper limits set forth above, reduction of ion conductivity of the viscous electrolyte composition can be inhibited. Furthermore, when the proportional content of the polymer (P) is not less than any of the lower limits set forth above, this facilitates formation of an electrode using the shaping material for an electrode.

Low Molecular Weight Organic Compound (O) Having Molecular Weight of Less than 10,000

The low molecular weight organic compound (O) having a molecular weight of less than 10,000 includes 80 mass % or more of a compound having a lower volatilization rate than N-methylpyrrolidone (hereinafter, also referred to as a "low volatilization rate compound") and optionally includes a compound having an equal or higher volatilization rate than N-methylpyrrolidone (hereinafter, also referred to as a "high volatilization rate compound") in a proportion of not less than 0 mass % and not more than 20 mass %.

When the proportion constituted by a high volatilization rate compound among the low molecular weight organic compound (O) is 20 mass % or less, this can reduce the amount of a component that is volatilized during electrode formation and can inhibit the occurrence of problems of odor and stability.

The proportional content of the low molecular weight organic compound (O) in the organic composition (P—O) is normally 50 mass % or more, and preferably 70 mass % or more, and is preferably 99 mass % or less, and more preferably 97 mass % or less. Setting the proportional content of the low molecular weight organic compound (O) as not less than any of the lower limits set forth above facilitates production of the shaping material for an electrode and can inhibit reduction of ion conductivity of the viscous electrolyte composition. Moreover, setting the proportional content of the low molecular weight organic compound (O) as not more than any of the upper limits set forth above can facilitate electrode formation using the shaping material for an electrode.

Low Volatilization Rate Compound

Examples of the low volatilization rate compound include, but are not specifically limited to, tris(ethylhexyl) phosphate, adiponitrile, 1,3-propane sultone, glutaric anhydride, succinic anhydride, succinonitrile, tributyl phosphate, tetraglyme, diglycolic anhydride, sulfolane, ethyl methyl sulfone, dimethyl sulfone, tris(butoxyethyl) phosphate, sulfolene, diethyl sulfone, ethylene sulfate (1,3,2-dioxathiolane-2,2-dioxide), vinyl ethylene carbonate, ethylene carbonate, N-methyloxazolidone, propylene carbonate, fluoroethylene carbonate, triglyme, triethyl phosphate, citraconic anhydride, methyl carbamate, and dimethylimidazolidinone. Of these examples, organic compounds having a higher volatilization rate than triethyl phosphate, such as tris(ethylhexyl) phosphate, adiponitrile, 1,3-propane sultone, glutaric anhydride, succinic anhydride, succinonitrile, tributyl phosphate, tetraglyme, diglycolic anhydride, sulfolane, ethyl methyl sulfone, dimethyl sulfone, tris(butoxyethyl) phosphate, sulfolene, diethyl sulfone, ethylene sulfate (1,3,2-dioxathiolane-2,2-dioxide), vinyl ethylene carbonate, ethylene carbonate, N-methyloxazolidone, propylene carbonate, fluoroethylene carbonate, and triglyme, are preferable from a viewpoint of further reducing the amount of a component that volatilizes during electrode formation, and organic compounds having a higher volatilization rate than propylene carbonate, such as tris(ethylhexyl) phosphate, adiponitrile, 1,3-propane sultone, glutaric anhydride, succinic anhydride, succinonitrile, tributyl phosphate, tetraglyme, diglycolic anhydride, sulfolane, ethyl methyl sulfone, dimethyl sulfone, tris(butoxyethyl) phosphate, sulfolene, diethyl sulfone, ethylene sulfate (1,3,2-dioxathiolane-2,2-dioxide), vinyl ethylene carbonate, ethylene carbonate, and N-methyloxazolidone, are more preferable.

One of the organic compounds described above may be used individually, or two or more of the organic compounds described above may be used together. In particular, from a viewpoint of reducing the amount of a component that volatilizes during electrode formation while also improving solubility of the ionic material, it is preferable to use two or more of the above-described organic compounds together as the low volatilization rate compound, and more preferable to use three or more of the above-described organic compounds together as the low volatilization rate compound.

The proportion constituted by the low volatilization rate compound among the low molecular weight organic compound (O) is not specifically limited so long as it is 80 mass % or more, but is preferably 90 mass % or more.

High Volatilization Rate Compound

Examples of the high volatilization rate compound include, but are not specifically limited to, N-methylpyrrolidone, γ-butyrolactone, dimethyl oxalate, vinylene carbonate, dimethyl sulfoxide, trimethyl phosphate, dimethyl carbonate, diethyl carbonate, ethyl methyl carbonate, ethyl acetate, ethyl propionate, and propyl propionate. Of these examples, organic compounds having an equal or higher volatilization rate than trimethyl phosphate, such as N-methylpyrrolidone, γ-butyrolactone, dimethyl oxalate, vinylene carbonate, dimethyl sulfoxide, and trimethyl phosphate, are preferable from a viewpoint of reducing the amount of volatilization during electrode formation.

One of the organic compounds described above may be used individually, or two or more of the organic compounds described above may be used together.

The proportion constituted by the high volatilization rate compound among the low molecular weight organic compound (O) is not specifically limited so long as it is not less than 0 mass % and not more than 20 mass %, but is preferably 10 mass % or less.

Note that in the low molecular weight organic compound (O), the proportional content of a compound that is a liquid at a temperature of 5° C. under atmospheric pressure is preferably not less than 0 mass % and not more than 20 mass %, and more preferably 10 mass % or less. When the proportional content of a compound that is a liquid at a temperature of 5° C. under atmospheric pressure is not more than any of the upper limits set forth above, it is possible to obtain a shaping material for an electrode that is difficult to combust and to inhibit mechanical failure or the like being brought about by a volatilized compound becoming attached as a liquid in the surroundings.

Examples of the compound that is a liquid at a temperature of 5° C. under atmospheric pressure include, but are not specifically limited to, tris(ethylhexyl) phosphate, adiponitrile, 1,3-propane sultone, tributyl phosphate, tetraglyme, tris(butoxyethyl) phosphate, vinyl ethylene carbonate, propylene carbonate, triglyme, triethyl phosphate, citraconic anhydride, N-methylpyrrolidone, γ-butyrolactone, trimethyl phosphate, dimethyl carbonate, diethyl carbonate, ethyl methyl carbonate, ethyl acetate, ethyl propionate, and propyl propionate.

Properties of Viscous Electrolyte Composition

The viscous electrolyte composition preferably has the following properties but is not specifically limited to having these properties.

Viscosity

It is preferable that components contained in the viscous electrolyte composition are miscible, and more preferable that the viscous electrolyte composition is a liquid at a temperature of 35° C. under atmospheric pressure. The viscosity of the viscous electrolyte composition at a temperature of 25° C. is preferably 10 mPa·s or more, more preferably 20 mPa·s, and even more preferably 50 mPa·s or more.

Note that the "viscosity" referred to in the present disclosure is the viscosity at a temperature of 25° C. measured at a motor speed of 1,000 rpm using an EMS viscometer (EMS-1000S produced by Kyoto Electronics Manufacturing Co., Ltd.) under hermetically sealed conditions such that volatilization of organic composition and mixing in of moisture from air do not occur. Also note that viscosity measured by this measurement method is fundamentally the same value as a value measured in accordance with JIS Z8803. The viscosity of the viscous electrolyte composition can be adjusted by altering the chemical composition of the viscous electrolyte composition. Specifically, the viscosity of the viscous electrolyte composition can be increased by compounding a high-viscosity compound or by increasing the concentration of the ionic material, for example.

In a situation in which one wishes to determine the chemical composition at which a liquid is formed when a solid compound is mixed, this can be determined by mixing equal amounts of all compounds used in the composition, heating the overall mixture to at least the melting point of a compound having a highest melting point among these compounds to cause melting, and then performing cooling to the temperature at which the composition is to be used as a liquid. In a case in which the overall mixture is a liquid at that point, the mixture can be used as the composition in that form, and in a case in which some of the mixture is a solid, the chemical composition at which a liquid state is displayed can be determined by quantifying the chemical composition of the supernatant in a gas chromatograph or a liquid chromatograph.

Ion Conductivity

The ion conductivity of the viscous electrolyte composition at a temperature of 35° C. is preferably $1.0 \times 10^{-4}$ S/cm or more. Moreover, the ion conductivity of the viscous electrolyte composition at a temperature of −20° C. is preferably $1.0 \times 10^{-4}$ S/cm or more. When the ion conductivity of the viscous electrolyte composition is not less than the lower limit set forth above, it is possible to cause good progression of an electrochemical reaction in an electrochemical device that includes an electrode formed using the shaping material for an electrode.

Conductive Filler

Any conductive filler that can be used in the field of electrochemical devices, such as acetylene black, Ketjen-black, graphite, or graphene, and particularly any particulate conductive filler can be used as the conductive filler that is an optional component without any specific limitations. The inclusion of a conductive filler makes it possible to form an electrode having excellent electrical conductivity.

The proportional content of the conductive filler in the shaping material for an electrode per 100 parts by mass of the viscous electrolyte composition is preferably 5 parts by mass or more, and more preferably 10 parts by mass or more, and is preferably 100 parts by mass or less, and more preferably 70 parts by mass or less. When the proportional content of the conductive filler is not less than any of the lower limits set forth above, the electrical conductivity of an electrode can be sufficiently increased. Moreover, when the proportional content of the conductive filler is not more than any of the upper limits set forth above, it is possible to prevent mixing becoming difficult and production of the shaping material for an electrode becoming difficult.

Solid Electrolyte

The shaping material for an electrode may contain an ion conducting inorganic solid electrolyte (SE) from a viewpoint that improvement of safety can be expected. Since an inorganic solid electrolyte (SE) is non-volatile and is typically non-combustible or has low combustibility, the safety of an electrochemical device tends to increase when an inorganic solid electrolyte (SE) is compounded in a higher ratio in the shaping material for an electrode.

The inorganic solid electrolyte (SE) may have a particulate form or a fibrous form. The proportion in which the inorganic solid electrolyte (SE) is compounded relative to the total volume of the ionic material (S), the organic composition (P—O), and the inorganic solid electrolyte (SE) is preferably 10 volume % or more, more preferably 30 volume % or more, even more preferably 50 volume % or more, and particularly preferably 70 volume % or more. The particle diameter of the inorganic solid electrolyte (SE) is preferably smaller than that of the active material (A) from a viewpoint of increasing the volume fraction of the active material in an electrode.

The inorganic solid electrolyte (SE) may be an ion conducting ceramic and may, for example, be a lithium ion conductor such as a Li—P—S-based conductor (for example, $Li_7P_3S_{11}$), a Li—Ge—P—S-based conductor (for example, $Li_{10}GeP_2S_{12}$), a Li—Si—P—S—Cl-based conductor (for example, $Li_{9.54}Si_{1.74}P_{1.44}S_{11.7}Cl_{0.3}$), a Li—La—Zr—O-based conductor (for example, $Li_7La_3Zr_2O_{12}$), a Li—Al—Ge—P—O-based conductor (for example, $Li_{1.5}Al_{0.5}Ge_{1.5}P_3O_{12}$), a Li—La—Zr—O-based conductor (for example, $Li_7La_3Zr_2O_{12}$), a Li—La—Zr—Ta—O-based conductor (for example, $Li_{6.75}La_3Zr_{1.75}Ta_{0.25}O_{12}$), a Li—La—Ta—O-based conductor (for example, $LiLa_{0.51}TaO_{2.94}$), a Li—Al—Si—P—Ti—O-based conductor (for example, $Li_2Al_2SiP_2TiO_{13}$), a Li—Ti—Al—Si—P—O-based conductor (for example, $Li_{1.4}Ti_{1.6}Al_{0.4}P_3O_{12}$), or a Li—Ba—Cl—O-based conductor (for example, $Li_{2.99}Ba_{0.005}O_{1+x}Cl_{1-2x}$); a sodium ion conductor such as P-alumina or a Na—Ba—Cl—O-based conductor (for example, $Na_{2.99}Ba_{0.005}O_{1+x}Cl_{1-2x}$); a copper ion conductor such as a Rb—Cu—I—C-based conductor (for example, $RbCu_4I_{1.75}Cl_{3.25}$); or a silver ion conductor such as a Ag—I—W—O-based conductor (for example, $Ag_6I_4WO_4$).

Fiber Component

The fiber component that is an optional component is preferably a fiber component having a fiber diameter that is a nanosize (maximum diameter of less than 1 µm), and more preferably a fiber component having an average fiber diameter of not less than 0.4 nm and not more than 500 nm, but is not specifically limited thereto. Compounding a fiber component having a nanosize fiber diameter aids cohesion of components contained in the shaping material for an electrode and makes it possible to form an electrode having excellent strength. Note that the fiber diameter can be measured using a microscope such as a scanning electron microscope or a transmission electron microscope. Although the fiber diameter may be of a nanosize prior to compounding or may be of a nanosize after kneading as the shaping material for an electrode, it is important that bridges having a nanosize diameter are formed between particles of the active material (A). When the presently disclosed electrode is observed under a microscope, it is preferable that 10 or more bridges are present, and more preferable that 20 or more bridges are present in a 100 µm-square field of view. In a situation in which the electrode is unsuitable for observation due to the presence of a volatile organic compound, the electrode is preferably observed after drying.

Examples of the fiber component having a nanosize fiber diameter include, but are not specifically limited to, carbon nanotubes, carbon nanofiber, cellulose nanofiber, PTFE (polytetrafluoroethylene) nanofiber, PVdF (polyvinylidene fluoride) nanofiber, and polyacrylonitrile nanofiber. Moreover, nanofiber of any macromolecules can be produced by electrospinning and then used as the fiber component. Of these examples, carbon nanotubes, PTFE nanofiber, and macromolecule nanofiber obtained by electrospinning are preferable as the fiber component having a nanosize fiber diameter in terms of fiber fineness.

Although no specific limitations are placed on the amount of the fiber component, the amount of the fiber component per 100 parts by mass of the active material (A), for example, is preferably 8 parts by mass or less, more preferably 5 parts by mass or less, and even more preferably 3 parts by mass or less. When the content of the fiber component is not more than any of the upper limits set forth above, reduction of electrode density can be inhibited.

Additive

Any additive that can be used in the field of electrochemical devices, such as an electrode protectant or a flame retardant, can be used as the additive that is an optional component without any specific limitations.

Note that compounds having a low volatilization rate are preferable as the additive, compounds having a lower volatilization rate than triethyl phosphate are more preferable as the additive, and compounds having a lower volatilization rate than polycarbonate are even more preferable as the additive.

Electrode Protectant

Any electrode protectant that can be used in the field of electrochemical devices can be used as the electrode protectant without any specific limitations.

Specifically, examples of negative electrode protectants include fluoroethylene carbonate, vinylene carbonate, 1,3,2-dioxathiolane-2,2-dioxide, 1,3-propane sultone, butane sultone, vinyl ethylene carbonate, and diallyl carbonate.

Flame Retardant

Examples of the flame retardant include phosphoric acid esters having a carbon number of 24 or less, phosphorous acid esters having a carbon number of 24 or less, and phosphazenes. Of these examples, the use of a phosphoric acid ester as the flame retardant is preferable.

Further examples of additives that can be used include whiskers, red phosphorus, aluminum hydroxide, magnesium hydroxide, antimony, cyclophosphazene oligomer, silica, alumina, zirconia, barium titanate, melamine, melamine cyanurate, ammonium carbonate, ammonium chloride, sodium bicarbonate, and oxybisbenzylhydrazide.

The proportional content of each additive in the shaping material for an electrode is not specifically limited but is normally 5 mass % or less.

Physical Properties of Shaping Material for Electrode

The shaping material for an electrode preferably has a clay-like or powdered form, and more preferably has a clay-like form.

Moreover, the porosity of the shaping material for an electrode is preferably 20 volume % or less, or becomes 20 volume % or less through compression. By using a shaping material for an electrode that has the porosity set forth above, it is possible to form a high-density electrode.

Production of Shaping Material for Electrode

The shaping material for an electrode can be produced by mixing the components described above in any order without any specific limitations. In particular, it is preferable that the shaping material for an electrode is produced by mixing organic compounds in advance and subsequently adding and mixing inorganic compounds from a viewpoint of ease of production. Moreover, in a case in which a mixture of the ionic material (S) and the organic composition (P—O) is a liquid, the ionic material (S) and the organic composition (P—O) are preferably converted to a liquid mixture before being used in production of the shaping material for an electrode.

Note that in a situation in which the shaping material for an electrode is not used soon after production, it is preferable that the shaping material for an electrode is stored in a hermetically sealed vessel or is stored with a protective film affixed in order to prevent volatilization of components contained in the shaping material for an electrode.

Electrode

The presently disclosed electrode is an electrode that includes a portion formed using the presently disclosed shaping material for an electrode. In other words, the presently disclosed electrode may be composed of only the shaping material for an electrode or may be an electrode that includes a portion formed using the shaping material for an electrode on the surface of a current collector or the like. By using the presently disclosed shaping material for an electrode in this manner, it is possible to obtain an electrode having a high proportional content of an active material while also inhibiting the occurrence of problems of odor and stability.

Note that the presently disclosed electrode may include a plurality of stacked portions that are each formed using the shaping material for an electrode. Also note that the plurality of stacked electrode shaping materials may have different chemical compositions to one another. In a case in which portions each formed using the shaping material for an electrode are stacked on a current collector, by setting the ratio of the viscous electrolyte composition in the shaping material for an electrode such as to increase sequentially from closest to the current collector to furthest from the current collector, electrochemical device output has a low tendency to decrease even when the electrode thickness is increased.

More specifically, the presently disclosed electrode may, for example, be an electrode that is obtained through film formation of the presently disclosed shaping material for an electrode in any shape such as a sheet shape or an electrode that is obtained by affixing the shaping material for an electrode to a current collector. The thickness of the electrode may be uniform or may have a gradient. An electrode of which the thickness has a gradient can be produced, for example, through nipping using rolls having a different clearance at both ends thereof.

Note that since bonding is maintained only through physical affinity in the presently disclosed electrode, it is easier to maintain close adherence with an adherend such as a current collector in the case of a sheet shape that can easily copy the shape of the adherend.

In a case in which the shaping material for an electrode is affixed to a current collector, the shape of the shaping material for an electrode that is affixed can be any shape. Moreover, the shaping material for an electrode may be affixed to just one side of the current collector or may be affixed to both sides of the current collector. Furthermore, a frame may be provided outward of the shaping material for an electrode in order to control the thickness or isolate the shaping material for an electrode from the outside. The frame is preferably electrically insulating and can, for example, be formed using a polymeric material or the like. Examples of methods by which the frame may be formed include a method in which a frame member that has been pre-shaped is provided, a method in which molten resin is supplied by a dispenser and is used to form the frame in situ, and a method in which the frame is formed by inkjet printing.

The current collector preferably includes a through hole at a site where the shaping material for an electrode is affixed. When the current collector includes a through hole at a site where the shaping material for an electrode is affixed, the inside of the through hole becomes filled with the shaping material for an electrode, and thus the shaping material for an electrode can be affixed well. Moreover, when the current collector includes a through hole, this enables simple pre-doping by a perpendicular pre-doping method in a case in which an active material having initial irreversible capacity is used as the active material (A), for example. Furthermore, the inclusion of a through hole makes it possible to increase the ratio of active material inside an electrochemical device and to improve energy density. The current collector including a through hole may be a perforated metal, an expanded metal, a mesh, carbon non-woven fabric, or the like.

Note that in a case in which the current collector does not include a through hole, doping can be performed by bringing a doping source such as lithium metal directly into contact with the portion that is formed using the shaping material for an electrode. More specifically, the doping source may be affixed to the current collector in advance or may be brought into contact with the portion that is formed using the shaping material for an electrode.

The current collector preferably has a conductive coating at a surface that is in contact with the shaping material for an electrode. When the current collector has a conductive coating at a surface that is in contact with the shaping material for an electrode, electrical conductivity of the electrode can be increased, and close adherence with the shaping material for an electrode can be increased through surface irregularities. Note that any conductive coating that can be used in the field of electrochemical devices can be used as the conductive coating without any specific limitations.

The porosity of the portion that is formed using the shaping material for an electrode is preferably 20 volume % or less, and more preferably 15 volume % or less. When the porosity of the portion that is formed using the shaping material for an electrode is not more than any of the upper limits set forth above, it is possible to cause good progression of an electrochemical reaction in an electrochemical device.

Moreover, in the portion that is formed using the shaping material for an electrode, the shaping material for an electrode is preferably cross-linked or polymerized. This is because cross-linking or polymerization of the shaping material for an electrode makes it possible to obtain an electrode having high strength.

The method by which the shaping material for an electrode is cross-linked or polymerized can be a known method such as heating or irradiation with ultraviolet light or electron beams without any specific limitations.

Method of Producing Electrode

The presently disclosed method of producing an electrode can be used in production of the presently disclosed electrode set forth above.

Note that in the presently disclosed method of producing an electrode, the shaping material for an electrode can be shaped to produce an electrode in an open atmosphere, although this is not a specific limitation. The term "open atmosphere" refers to an atmosphere in which there is gas flow, an atmosphere that is being evacuated, or the like, where an atmosphere in contact with the shaping material for an electrode does not become saturated with vapor from the shaping material for an electrode.

Note that production of an electrode is preferably carried out at not lower than the dew point of the production atmosphere from a viewpoint of preventing adhesion of moisture. For the same reason, it is preferable that a processing machine in which water is used as a cooling medium (or heating medium) is not used in electrode production.

Since the presently disclosed method of producing an electrode uses a shaping material for an electrode in which the proportion constituted by a compound having an equal or higher volatilization rate than N-methylpyrrolidone is small, electrode production can be performed without a drying step of drying the shaping material for an electrode, unlike in production of an electrode using a slurry that contains a large amount of a solvent.

In a case in which an electrode that is composed of only the shaping material for an electrode is to be produced, the electrode can be produced by shaping the shaping material for an electrode into a desired shape such as a sheet shape, for example, and then optionally performing cross-linking or polymerization, but is not specifically limited to being produced in this manner.

Note that in a case in which the shaping material for an electrode is shaped into a sheet shape, it is preferable that a plurality of strands formed of the shaping material for an electrode are squashed to shape the plurality of strands into a sheet shape from a viewpoint of easily obtaining a sheet formed of the shaping material for an electrode and facilitating thinning of the sheet, but this is not a specific limitation. The cross-sectional shape of the strands may be a circle, an ellipse, a triangle, a quadrilateral, or any other polygon, for example. The cross-sectional shape is preferably not a shape having hollows like a star shape from a viewpoint of not causing the formation of pores in the electrode.

In a case in which an electrode having the shaping material for an electrode affixed to the surface of a current collector is to be produced, the electrode can be produced by performing forming of the shaping material for an electrode to a desired shape and subsequently affixing the shaping material for an electrode to one side or both sides of the current collector, but is not specifically limited to being produced in this manner. By forming and subsequently affixing the shaping material for an electrode, the shape of a portion that is formed of the shaping material for an electrode and is disposed on the current collector can easily be adjusted to a desired shape. For example, a sheet-shaped shaping material for an electrode may be continuously formed on a metal roll and then the shaping material for an electrode may be intermittently cut away perpendicular to the machine direction on the metal roll so as to transfer a shaping material for an electrode that is split up rather than continuous onto the current collector. In a case in which forming is performed after affixing to the current collector or in which affixing and forming are performed concurrently, force that is applied and work that is carried out are preferably limited so as not to deform or damage the current collector.

Note that in a case in which the shaping material for an electrode is to be affixed to both sides of the current collector, it is preferable that the shaping material for an electrode is affixed to both sides of the current collector at roughly the same time, and more preferable that the shaping material for an electrode is affixed to both sides of the current collector at the same time.

A step of adjusting the shape and/or thickness of the shaping material for an electrode is preferably included in a case in which the electrode is produced as described above.

The shape of the shaping material for an electrode can easily be adjusted through paring of the shaping material for an electrode, for example.

Moreover, the thickness of the shaping material for an electrode can easily be adjusted through squashing of the shaping material for an electrode using a roll, or the like, or through paring of the shaping material for an electrode, for example.

In a case in which thickness adjustment is performed through squashing of the shaping material for an electrode, the shaping material for an electrode is preferably squashed using a curved surface having a radius of curvature of 100 mm or less from a viewpoint of easily adjusting the thickness. Note that in the squashing, it is easy to obtain an electrode of uniform thickness by performing squashing while controlling the clearance such as to be constant. The curved surface having a radius of curvature of 100 mm or less is preferably a roll shape, and is more preferably rotating. The rotation may be at the same speed relative to the shaping material for an electrode or may have a speed difference in the forward direction or the reverse direction relative to the shaping material for an electrode. By providing a speed difference, it is possible to control at which side the shaping material for an electrode becomes affixed to. In a case in which the shaping material for an electrode is sandwiched between bodies having different speeds, the shaping material for an electrode typically affixes more easily to the body having a higher speed. The thickness is preferably gradually reduced over multiple stages (two or more stages) in the squashing step rather than in one stage because this reduces stress acting on the shaping material for an electrode.

Moreover, in a case in which the thickness accuracy of the shaping material for an electrode is to be controlled with a high degree of accuracy to within ±5%, for example, it is preferable that rough adjustment of thickness is performed and then fine adjustment is performed using a curved surface having a radius of curvature of 0.5 mm or more. By stroking the shaping material for an electrode using a curved surface having a radius of curvature of 0.5 mm or more, the thickness accuracy of the electrode can be improved. When this is performed, the curved surface may be moving, the shaping material for an electrode may be moving, or both the curved surface and the shaping material for an electrode may be moving. Stroking is preferably performed with a constant pressing force, and this pressing force is preferably of a strength that does not change the average thickness of the electrode by 1% or more.

In a case in which a roll is used to perform squashing of the shaping material for an electrode, the surface of the roll is preferably not tacky, and is more preferably formed of a ceramic, a fluoropolymer, a silicone polymer, or a metal. The roll surface may be subjected to treatment for increasing surface roughness such as to provide a satin finish. Treatment of roughening the surface can be performed by sandblasting or the like. The height difference of the roughness is preferably small because excessive roughening may result in the shaping material for an electrode becoming buried in holes (depressions), and the arithmetic average roughness (Ra) of the surface is preferably 10 μm or less, more preferably 5 μm or less, and even more preferably 2 μm or less. Moreover, the major diameter of holes is preferably short. The average length (Rsm) of surface elements is preferably 500 μm or less, more preferably 300 μm or less, and even more preferably 200 μm or less. Moreover, tape of constant thickness may be affixed to the surface of the roll in order to control the thickness of the produced electrode. Furthermore, the surface of the roll may be provided with a pattern, and this pattern may be transferred to the shaping material for an electrode. The roll preferably has a small diameter from a viewpoint of inhibiting volatilization of components from the shaping material for an electrode. Moreover, a surface of the shaping material for an electrode that comes into contact with the roll is preferably provided with a wave shape or irregularities using a known method such as forming or notching, for example, from a viewpoint of preventing the shaping material for an electrode from becoming affixed to the roll. The height difference of the wave shape or irregularities is preferably 1% to 95% of the thickness at a thickest section of the shaping material for an electrode. Forming can be performed by setting the shape of an outlet die of a kneader as a wave shape, for example. By imparting a shape such as described above to the surface of the shaping material for an electrode, the shaping material for an electrode becomes easier to squash, which facilitates thickness control.

In the presently disclosed method of producing an electrode, it is preferable that the thickness of the shaping material for an electrode is measured and feedback control of basis weight of the shaping material for an electrode is performed. Since the proportion constituted by a compound having an equal or higher volatilization rate than N-methylpyrrolidone in the shaping material for an electrode is not less than 0 mass % and not more than 20 mass % and thus the basis weight of the shaping material for an electrode can easily be determined from the thickness thereof, it is easy to control the basis weight by measuring the thickness and performing feedback control of the basis weight. The thickness measurement can easily be performed using a contact-type thickness meter or a laser-type thickness meter.

An electrode that has been produced in accordance with the presently disclosed production method is preferably incorporated into an electrochemical device as soon as possible after production. The electrode is preferably incorporated into an electrochemical device within 20 days, more preferably within 10 days, and even more preferably within 5 days.

Method of Recycling Electrode

The presently disclosed method of recycling an electrode is a method of recycling a presently disclosed electrode in which a shaping material for an electrode is affixed to a current collector and includes a step of peeling the shaping material for an electrode from the current collector. By peeling the shaping material for an electrode from the electrode in which a portion formed of the shaping material for an electrode is disposed on a current collector in this manner, the peeled shaping material for an electrode and the current collector can easily be reused. The shaping material for an electrode can easily be peeled from the current collector in the presently disclosed electrode because the shaping material for an electrode is not chemically bonded to the current collector. The shaping material for an electrode can be peeled from the current collector without leaving an active material residue by, for example, inserting a spatula having a sharp edge as a peeling jig at an interface with the current collector and then moving the spatula in that state. The material of the peeling jig is preferably a material having a lower hardness than a current collector or equipment with which the peeling jig comes into contact. Moreover, a material the does not cause the formation of conductive fines is preferable. Examples of materials that satisfy both of these conditions include plastic, rubber, wood, and paper, though the material of the peeling jig is not limited thereto. A case in which the electrode is notched in advance of peeling in order to control a location where peeling is desired and a location where peeling is not desired is also a preferable embodiment. The material of the notching jig is preferably a material having lower hardness than a current collector or equipment with which the notching jig comes into contact. However, the clearance may be controlled such that the notching jig does not come into direct contact with the current collector or equipment. The electrode that is a subject of recycling is not limited to being an electrode obtained partway through device production and may be an electrode resulting from disposal/disassembly of a device. In a case in which the presently disclosed electrode has not been subjected to cross-linking, the active material can easily be separated by dissolving the viscous electrolyte composition in an organic solvent in which the electrolyte composition can dissolve. The separated active material can be used once again in device production. Components of the separated viscous electrolyte composition can be reused by performing purification by distillation, recrystallization, or the like. The current collector can be recycled after performing washing with an organic solvent in which residue of the viscous electrolyte composition can dissolve.

Electrochemical Device

The presently disclosed electrochemical device includes the presently disclosed electrode and can display good electrochemical characteristics. Specifically, the presently disclosed electrochemical device normally includes a positive electrode, a negative electrode, and an electrolyte solution, and optionally further includes a separator. At least one of the positive electrode and the negative electrode of the presently disclosed electrochemical device is required to be the presently disclosed electrode.

In particular, it is preferable that one of the positive electrode and the negative electrode in the presently disclosed electrochemical device is the presently disclosed electrode and that a counter electrode of the presently disclosed electrode is formed of at least one of an alkali metal, an alkaline earth metal, and metal aluminum. The presently disclosed electrode may contain more moisture than a conventional electrode since it can be produced in an open atmosphere, but imported moisture originating from the electrode can be trapped well by using a counter electrode such as described above.

In the presently disclosed electrochemical device, either or both of the counter electrode and the separator preferably contain an inorganic filler having moisture trapping ability and/or an ionic material having moisture trapping ability. When the counter electrode and/or the separator contain an inorganic filler having moisture trapping ability and/or an ionic material having moisture trapping ability, imported moisture originating from the electrode can be trapped well.

Any separator that can be used in the field of electrochemical devices can be used as the separator without any specific limitations. Moreover, the electrolyte solution is not specifically limited but is preferably the same composition as the viscous electrolyte composition contained in the shaping material for an electrode. Examples of the inorganic filler having moisture trapping ability include, but are not specifically limited to, silica, alumina, magnesium sulfate, calcium sulfate, magnesium oxide, calcium oxide, magnesium hydride, lithium hydride, calcium hydride, and phosphorus pentoxide particles. Examples of the ionic material having moisture trapping ability include, but are not specifically limited to, bis(oxalato)borate salts and difluoro (oxalato)borate salts.

EXAMPLES

The volatilization rates of various compounds were first evaluated by performing Reference Example 1 described below.

Reference Example 1

Inside a dry room controlled to a room temperature of 18° C. and a dew point of −40° C., 1 g of each organic compound indicated in Table 1 was weighed onto an aluminum plate of 5 cm in diameter and was left in a draft controlled to a wind speed of 0.5 m/min without attaching a lid or the like. The weight of the organic compound was measured after 12 hours, and the volatilization rate (=(mass loss/initial mass)× 100%) was evaluated.

The results are shown in Table 1.

TABLE 1

| Compound | Volatilization rate [mass %] |
|---|---|
| Tris(ethylhexyl) phosphate | 0.1 |
| Adiponitrile | 0.3 |

TABLE 1-continued

| Compound | Volatilization rate [mass %] |
|---|---|
| 1,3-Propane sultone | 0.4 |
| Glutaric anhydride | 0.5 |
| Succinic anhydride | 0.6 |
| Succinonitrile | 0.8 |
| Tributyl phosphate | 1.0 |
| Tetraglyme | 1.0 |
| Diglycolic anhydride | 1.3 |
| Sulfolane | 1.5 |
| Ethyl methyl sulfone | 1.5 |
| Dimethyl sulfone | 1.5 |
| Tris(butoxyethyl) phosphate | 1.6 |
| Sulfolene | 1.6 |
| Diethyl sulfone | 2.5 |
| Ethylene sulfate (1,3,2-dioxathiolane-2,2-dioxide) | 2.8 |
| Vinyl ethylene carbonate | 3.5 |
| Ethylene carbonate | 4.1 |
| N-Methyloxazolidone | 7.3 |
| Propylene carbonate | 7.8 |
| Fluoroethylene carbonate | 11.3 |
| Triglyme | 23.2 |
| Triethyl phosphate | 34.7 |
| Citraconic anhydride | 38.7 |
| Methyl carbamate | 42.1 |
| Dimethylimidazolidinone | 43.1 |
| N-Methylpyrrolidone | 47.5 |
| γ-Butyrolactone | 50.8 |
| Dimethyl oxalate | 62.8 |
| Vinylene carbonate | 66.5 |
| Dimethyl sulfoxide | 66.6 |
| Trimethyl phosphate | 80.0 |
| Dimethyl carbonate | 100.0 |
| Diethyl carbonate | 100.0 |
| Ethyl methyl carbonate | 100.0 |
| Ethyl acetate | 100.0 |
| Ethyl propionate | 100.0 |
| Propyl propionate | 100.0 |

Example 1

After weighing out 5 g of ethylene carbonate and 2 g of dimethyl sulfone as low volatilization rate compounds, 1 g of 1,3,2-dioxathiolane-2,2-dioxide as a negative electrode protectant, 1 g of an ethylene oxide-allyl glycidyl ether random copolymer (ethylene oxide:allyl glycidyl ether (molar ratio)=90:10) having a molecular weight of 1,000,000 as a polymer, and 1 g of $LiBF_4$ as an ionic material, these materials were mixed at room temperature to obtain a homogeneous viscous electrolyte composition. This operation was carried out in an open state but may alternatively be carried out in a hermetically sealed vessel. The obtained viscous electrolyte composition had an ion conductivity of $5.6 \times 10^{-3}$ S/cm.

A homogeneous clay-like shaping material for an electrode was then obtained by kneading 10 g of the viscous electrolyte composition and 40 g of graphite (604A produced by Nippon Carbon Co., Ltd.) as a negative electrode active material in an open mortar.

This shaping material for an electrode can be thinned without a support, and when the thickness thereof was adjusted to 200 μm, it was possible to pick up the shaping material for an electrode as a small piece of approximately 6 mm-square using tweezers while maintaining the shape thereof.

Also, since this shaping material for an electrode had a cohesive nature, it was possible to transfer the entire amount thereof from the mortar with almost no material remaining in the mortar.

All of the obtained shaping material for an electrode was extended into a sheet shape of 50 μm in thickness on a horizontal table using a metal hand roller of 30 mm in diameter and was then affixed to copper foil of 25 μm in thickness, which served as a current collector, to thereby produce a negative electrode for a lithium ion battery.

Note that although there was initially unevenness of thickness of the shaping material for an electrode affixed to the current collector, the thickness unevenness could eventually be suppressed to within ±2% through repeated application of the hand roller.

The work time was approximately 1 hour, the weight of the obtained negative electrode, excluding the current collector, was 50.0 g, and material loss in the production process is thought to be almost zero. Moreover, when the specific gravity of the produced negative electrode was measured, the measured specific gravity was almost the same as a value (theoretical value) calculated from the specific gravity of each material used in production, and thus a portion that was formed of the shaping material for an electrode is thought to be almost pore-free.

The density of the obtained negative electrode is shown together with the volume proportion of the active material in Table 2.

Example 2

After weighing out 6 g of ethylene carbonate and 2 g of dimethyl sulfone as low volatilization rate compounds, 1 g of an ethylene oxide-propylene oxide random copolymer (ethylene oxide:propylene oxide (molar ratio)=90:10) having a molecular weight of 1,000,000 as a polymer, and 1 g of $LiBF_4$ as an ionic material, these materials were mixed at room temperature to obtain a homogeneous viscous electrolyte composition. The obtained viscous electrolyte composition had an ion conductivity of $5.0 \times 10^{-3}$ S/cm.

A homogeneous clay-like shaping material for an electrode was then obtained by kneading 10 g of the viscous electrolyte composition, 25 g of lithium cobalt oxide (CELLSEED C produced by Nippon Chemical Industrial Co., Ltd.) as a positive electrode active material, and 5 g of acetylene black as a conductive filler in an open mortar.

This shaping material for an electrode can be thinned without a support, and when the thickness thereof was adjusted to 200 μm, it was possible to pick up the shaping material for an electrode as a small piece of approximately 6 mm-square using tweezers while maintaining the shape thereof.

Also, since this shaping material for an electrode had a cohesive nature, it was possible to transfer the entire amount thereof from the mortar with almost no material remaining in the mortar.

All of the obtained shaping material for an electrode was extended into a sheet shape of 50 μm in thickness on a horizontal table using a metal hand roller of 30 mm in diameter and was then affixed to aluminum foil of 25 μm in thickness, which served as a current collector, to thereby produce a positive electrode for a lithium ion battery.

Note that although there was initially unevenness of thickness of the shaping material for an electrode affixed to the current collector, the thickness unevenness could eventually be suppressed to within ±2% through repeated application of the hand roller.

The work time was approximately 1 hour, the weight of the obtained positive electrode, excluding the current collector, was 40.0 g, and material loss in the production process is thought to be almost zero. Moreover, when the specific gravity of the produced positive electrode was measured, the measured specific gravity was almost the same as a value (theoretical value) calculated from the specific gravity of each material used in production, and thus a portion that was formed of the shaping material for an electrode is thought to be almost pore-free.

The density of the obtained positive electrode is shown together with the volume proportion of the active material in Table 2.

TABLE 2

|  | Volume proportion of active material | Specific gravity (actual measurement value) | Specific gravity (theoretical value) |
|---|---|---|---|
| Example 1 | 71% | 1.95 | 1.96 |
| Example 2 | 66% | 3.86 | 3.88 |

Example 3

The negative electrode produced in Example 1, a separator (Celgard 2325 produced by Polypore) that had been impregnated with the viscous electrolyte composition produced in Example 1, and the positive electrode produced in Example 2 were stacked in order and were inserted into an aluminum laminate case. After 1 minute of degassing under vacuum, the edge of the aluminum laminate case was heat sealed to produce a lithium ion battery. No weight loss between before and after vacuum sealing was observed. Good operation of the battery was confirmed upon charging and discharging with a 0.1 C rate at 25° C. performed soon after production. The initial irreversible capacity was 15%, which is roughly equivalent to known lithium ion batteries, and the discharge capacity after 10 cycles was high at 99% of the initial discharge capacity.

Comparative Example 1

A planetary mixer was charged with 100 parts of lithium cobalt oxide (CELLSEED C produced by Nippon Chemical Industrial Co., Ltd.) as an active material and 3 parts of acetylene black as a conductive filler. N-methylpyrrolidone was added to adjust the solid content concentration to 90%, and 20 minutes of stirring and mixing were performed. Thereafter, 1 part in terms of solid content of polyvinylidene fluoride was added, 90 minutes of kneading was performed at a solid content concentration of 82%, and then N-methylpyrrolidone was further added to adjust the slurry viscosity. This slurry was used to produce a positive electrode according to a typical production method of an electrode for a lithium ion battery. Note that the slurry remained on the wall of the mixer and in piping, and required a lot of effort to clean. Slurry remaining in the vessel could not be used, which unfortunately resulted in the wasteful disposal thereof.

High-pressure roll pressing was performed to squash the electrode to a specific density and reduce thickness unevenness.

The resultant electrode had a larger basis weight at the edges thereof compared to at its center. This is due to edges inevitably having a tendency to rise up during slurry application.

Moreover, much effort and energy was expended in oven drying, etc., in order to dry the electrode.

This electrode was used to produce a battery and liquid injection was performed. The electrolyte solution was fed directly into a container of the battery, an opening of the container was kept as small as possible, and an argon atmosphere was provided in and around the container. Upon starting charging and discharging soon after liquid injection, the initial irreversible capacity was large at 25%, and the discharge capacity decreased rapidly to 80% of the initial discharge capacity after 10 cycles.

It is thought that the electrolyte solution had not permeated sufficiently to an inner part of the battery because charging and discharging were started soon after production of the battery.

Comparative Example 2

An electrode and a battery were produced by a method disclosed in Example 1 of JP2017-534164A as a production method that does not include a polymer (P). Note that in contrast to the presently disclosed method, semi-solid material remained all over the wall of a mixer, piping, and equipment, and much effort was required for cleaning.

Although high-pressure pressing was not required to squash the electrode to a specific density, when the proportion of the active material was increased in an attempt to achieve a high density, the material lost cohesion and a high active material density could not be obtained.

Moreover, although drying of the electrode was not necessary, work was made difficult by extremely volatile GBL that was a component of the electrolyte solution, and the operator breathed in and choked on vapor.

When a thickness meter probe (5 mm in diameter) was applied in measurement of the thickness of the electrode, the electrode was excessively soft and was depressed by the probe such that accurate thickness measurement was not possible. This presents a significant problem for production control of products.

Moreover, although an excess part of the electrode could be removed when this was attempted, residue was present and clean removal was not possible. There is a danger that such residue may lead to shorting of a battery.

A battery was produced using this electrode and operation thereof was confirmed upon starting charging and discharging soon after production.

Comparative Example 3

A positive electrode for a lithium ion battery was produced by a method disclosed in JP4593114B2 as a production method that does not include a low molecular weight organic compound. Note that in contrast to the presently disclosed method, the material was too hard to be processed at room temperature and needed to be heated to approximately 120° C. Reduction of polymer molecular weight was observed due to the polymer being subjected to shearing at high temperature.

Although high-pressure pressing was not required to squash the electrode to a specific density, when the proportion of the active material was increased in an attempt to achieve a high density, kneading was not possible and a high active material density could not be obtained.

Moreover, when the thickness of the electrode was measured after the electrode had cooled to room temperature, thickness unevenness was approximately ±10%. The electrode that had cooled to room temperature could not be deformed even upon pressing thereof, and it was not possible to remedy the thickness unevenness.

A battery was produced using this electrode and was placed inside a 60° C. thermostatic tank for 5 hours. Operation of the battery was confirmed upon starting charging and discharging thereafter.

Example 4

A twin-screw extruder (L/D=30) that included a kneading section and a vent section and that had a T-die capable of ejection with a sheet shape as an outlet thereof was supplied with ethylene carbonate in a mass ratio of 5, dimethyl sulfone in a mass ratio of 2, an ethylene oxide-propylene oxide copolymer having a molecular weight of 1,000,000 in a mass ratio of 1, PTFE as a fiber component in a mass ratio of 1, lithium bis(fluorosulfonyl)imide in a mass ratio of 1, lithium cobalt oxide in a mass ratio of 100, and acetylene black in a mass ratio of 3 using a total of 7 screw-type metering feeders. Twin-screw kneading and sheet forming of these materials were performed at room temperature of 25° C. With the clearance of the die outlet set as 100 µm, the material was nipped by chromium-plated iron rolls of 200 mm in diameter under an air pressure of 0.7 MPa while being sandwiched from both sides by releasable PET films moving at a speed of 12 m/min so as to continuously obtain a sheet-shaped positive electrode film having a thickness of 100 µm and a thickness accuracy of ±3%. With regards to the product temperature during this production process, the temperature at an inlet of the extruder was the same as room temperature (25° C.), the temperature in the hermetically sealed kneading section rose to 50° C. through frictional heat caused by kneading, and the outlet temperature was the same as room temperature (25° C.). Since volatile matter from the material was not completely zero, operation was carried out with local ventilation equipment installed as appropriate from a viewpoint of operator health. The obtained positive electrode film was stroked by a mirror finish SUS plate having a curved surface with a curvature of 300 mm in diameter so as to improve the thickness accuracy to ±1%. A good electrode that did not have a thickness difference or density difference between the center and edges thereof was obtained. This electrode could be held by tweezers even when at least 5 cm-square in size. The strength of the electrode is thought to be high as a result of the inclusion of a fiber component.

Example 5

A positive electrode film was obtained in the same way as in Example 4 with the exception that silicone oil having a temperature of 20° C. was caused to flow as a cooling medium in a barrel section of the twin-screw extruder. With regards to the product temperature during this production process, the temperature at an inlet of the extruder was the same as room temperature (25° C.), the temperature in the hermetically sealed kneading section rose through frictional heat caused by kneading but was suppressed to 30° C., and the outlet temperature was the same as room temperature (25° C.).

Once it had been confirmed that the temperature rise was small, devolatilization was performed from the vent section by a vacuum pump, but production could be performed without problems.

Example 6

The die of the twin-screw extruder in Example 4 was changed to a die capable of ejection with a cylindrical shape of 1 mm in diameter, and 10 of such dies were arranged at intervals of 8 mm. Screw-type metering feeders were used to supply ethylene carbonate in a mass ratio of 5, dimethyl sulfone in a mass ratio of 2, an ethylene oxide-propylene oxide copolymer having a molecular weight of 1,000,000 in a mass ratio of 1, PTFE as a fiber component in a mass ratio of 1, lithium bis(fluorosulfonyl)imide in a mass ratio of 1, lithium cobalt oxide in a mass ratio of 100, and acetylene black in a mass ratio of 3. Twin-screw kneading and ejection of 10 strands with a cylindrical shape of 1 mm in diameter were performed at room temperature of 25° C., and these strands were continuously supplied onto aluminum foil of 25 µm in thickness moving at 30 m/min. The shaping material for an electrode was thinned by being sandwiched between nip rolls of 100 mm in diameter that were made of chromium oxide-treated SUS, and was subsequently nipped by 30 mm rolls that had been silicone treated so as to improve the thickness accuracy and thereby obtain a sheet-shaped positive electrode in which a portion that was formed of the shaping material for an electrode had a thickness of 98 µm and a thickness accuracy of ±1%. With regards to the product temperature during this production process, the temperature at an inlet of the extruder was the same as room temperature (25° C.), the temperature in the hermetically sealed kneading section rose to 50° C. through frictional heat caused by kneading, and the outlet temperature was the same as room temperature (25° C.).

Example 7

Two twin-screw extruders like the one described in Example 6 were arranged side-by-side in order to attempt production in which negative electrode formation was performed simultaneously with respect to both sides of current collector foil. Ethylene carbonate in a mass ratio of 5, dimethyl sulfone in a mass ratio of 2, an ethylene oxide-propylene oxide copolymer having a molecular weight of 1,000,000 in a mass ratio of 1, PTFE as a fiber component in a mass ratio of 0.5, lithium bis(fluorosulfonyl)imide in a mass ratio of 1, and graphite as a negative electrode active material in a mass ratio of 50 were weighed out and loaded as a shaping material for an electrode. The shaping material for an electrode was thinned by being supplied onto a satin-finished SUS roll (Ra=0.82 µm; Rsm=112 µm) of 300 mm in diameter that was rotating at a circumferential speed of 50 m/min, applying a small diameter roll of 30 mm in diameter against this roll with a clearance of 100 µm, and rotating the small diameter roll in the opposite direction to the roll of 300 mm in diameter. This equipment was arranged symmetrically at both sides of copper foil of 25 µm in thickness that was moving at 50 m/min so as to adopt a configuration in which the copper foil was nipped by the 300 mm rolls. The shaping material for an electrode was transferred to both sides of the current collector foil simultaneously without even slightly detaching from the large diameter rolls, and thus it was possible to produce a negative electrode including portions formed of the shaping material for an electrode at both sides of the copper foil. A battery in which this negative electrode was used operated well. Moreover, when plastic spatulas were disposed in proximity to the edges of the shaping material for an electrode after the shaping material for an electrode had passed the small diameter roll and a mechanism was set up so as to sharply remove the shaping material for an electrode at the edges, it was possible to improve linearity of the edges of the portions formed of the shaping material for an electrode, to provide the negative electrode with better width accuracy, and to improve positional accuracy of the portions formed of the shaping material for an electrode at the front and rear of the negative electrode. Such electrode production is not possible with an application method that is a known technique.

Example 8

A negative electrode was produced in the same way as in Example 7 with the exception that a current collector foil including through holes (hole diameter: 500 μm; open fraction: 30%) was used. Upon cutting the produced negative electrode, it was confirmed that the through holes were cleanly filled with shaping material for an electrode and that shaping material for an electrode at opposite sides had joined together. This enabled production of a negative electrode having energy density, increased by an amount corresponding to the holes, and in which detachment of the shaping material for an electrode from the current collector was inhibited through joining of shaping material for an electrode at opposite sides.

Example 9

The shaping material for an electrode used in Example 7 was kneaded using an open roll mill including two chromium-plated iron rolls of 30 mm in diameter. The material was kneaded while performing cutting back until the entire material was homogeneously mixed, and the roll gap was gradually narrowed to 1 mm while performing this kneading. The product temperature rose to a maximum of 40° C. during kneading. Finally, the roll gap was adjusted to 100 μm, and the shaping material for an electrode was peeled from the rolls to obtain a negative electrode sheet of 100 μm in thickness. This negative electrode sheet was affixed to copper foil of 25 μm in thickness to obtain a negative electrode. A battery in which this negative electrode was used operated well.

Example 10

By using a milling machine to perform paring of the surface of the sheet-shaped positive electrode of 50 μm in thickness that was obtained in Example 2, it was possible to obtain a positive electrode of 40 μm in thickness.

Example 11

The negative electrode produced in Example 1 was, together with the current collector, wound half-way around a cylinder of 1 mm in diameter and was then returned to its original state. No particular change was observed. Moreover, no particular change was observed even when this was repeated 100 times.

Comparative Example 4

The negative electrode produced in Comparative Example 1 was, together with the current collector, wound half-way around a cylinder of 1 mm in diameter and was then restored to its original state. Cracks had formed in the portion that was formed of the shaping material for an electrode. Upon repeating this once more, some of the portion formed of the shaping material for an electrode became detached from the current collector, and thus the test was ended.

Example 12

Some of the portion formed of the shaping material for an electrode was peeled from the negative electrode produced in Example 1 using a plastic spatula. It was possible to cleanly peel the shaping material for an electrode from the copper foil. Moreover, by re-kneading the shaping material for an electrode that had been peeled off, placing the shaping material for an electrode at the location from which it had been peeled, and extending the shaping material for an electrode by a roller from above, it was possible to shape a negative electrode once again in the same manner. In the reproduced negative electrode, the shaping material for an electrode blended so well that it was not possible to visually determine the location where peeling had occurred.

Example 13

When all of the portion formed of the shaping material for an electrode in the positive electrode produced in Example 7 was peeled off using a plastic spatula, and the peeled-off piece was loaded into a twin-screw kneader and was used to produce a positive electrode, it was possible to shape a positive electrode once again in the same manner. Moreover, the performance of a battery in which the reproduced positive electrode was used had not changed at all from when the original positive electrode was used.

Reference Example 2

A viscous electrolyte composition containing 1 g of lithium bis(fluorosulfonyl)imide, 8 g of ethylene carbonate, and 1 g of an ethylene oxide-propylene oxide copolymer was thinly extended on a hot plate such as to have a thickness of 1 mm, a glass plate was arranged 1 cm above the viscous electrolyte composition, and the degree of volatilization of components contained in the viscous electrolyte composition was evaluated. The hot plate temperature was raised from 20° C. to 130° C. in increments of 10° C. Slight clouding of the glass was observed from 105° C., and clouding of the glass became clear from 125° C. This clouding is presumed to be due to ethylene carbonate that had volatilized from the viscous electrolyte composition and then condensed. The attached matter was a solid. This matter did not become attached at locations other than above the viscous electrolyte composition and did not move after becoming attached.

Reference Example 3

A viscous electrolyte composition was produced and the degree of volatilization of components contained in the viscous electrolyte composition was evaluated in the same way as in Reference Example 2 with the exception that ethylene carbonate was changed to propylene carbonate. Slight clouding of the glass was observed from 105° C., and clouding of the glass became clear from 125° C. This clouding is presumed to be due to propylene carbonate that had volatilized from the viscous electrolyte composition and then condensed.

The attached matter was a liquid and displayed slight movement to the surroundings along the glass. Since the attached matter was a liquid, it was somewhat less visible than in the case of solid ethylene carbonate in Reference Example 2. When the test was continued until almost all of the propylene carbonate had volatilized, some of the attached matter was observed to hang down as droplets. Although a small amount of liquid condensate is not problematic, equipment may be negatively affected in a situation in which a large amount of liquid condensate forms during production.

Example 14

A negative electrode was produced in the same way as in Example 1 with the exception that dimethyl sulfone was changed to succinonitrile.

The work time was approximately 1 hour, the weight of the obtained negative electrode, excluding the current collector, was 40.0 g, and material loss in the production process is thought to be almost zero.

Example 15

A negative electrode was produced in the same way as in Example 1 with the exception that dimethyl sulfone was changed to propylene carbonate.

The work time was approximately 1 hour, the weight of the obtained negative electrode, excluding the current collector, was 39.9 g, and propylene carbonate is thought to have been somewhat lost in the production process.

Example 16

Work was carried out in the same way as in Example 15 with the exception that the location where kneading work was performed was simply covered by an acrylic board so that air flow inside the dry room was not incident thereon. The weight of the obtained negative electrode, excluding the current collector, was 40.0 g, and material loss in the production process is thought to be almost zero.

Example 17

A negative electrode was produced in the same way as in Example 16 with the exception that propylene carbonate was changed to triethyl phosphate.

The work time was approximately 1 hour, the weight of the obtained negative electrode, excluding the current collector, was 39.9 g, and material loss in the production process is thought to have occurred but to be of a small quantity.

Comparative Example 5

After weighing out 2 g of ethylene carbonate as a low volatilization rate compound, 5 g of γ-butyrolactone as a high volatilization rate compound, 1 g of 1,3,2-dioxathiolane-2,2-dioxide as a negative electrode protectant, 1 g of an ethylene oxide-propylene oxide copolymer having a molecular weight of 1,000,000 as a polymer, and 1 g of $LiBF_4$ as an ionic material, these materials were mixed at room temperature to obtain a homogeneous viscous electrolyte composition.

A lithium ion battery negative electrode was then produced by the same operations as in Example 1.

There was odor of γ-butyrolactone in the air during work.

The work time was approximately 1 hour, the weight of the obtained negative electrode, excluding the current collector, was 38.9 g, and the majority of weight loss was judged to be due to volatilization of γ-butyrolactone in the production process.

Example 18

After weighing out 6 g of ethylene carbonate as a low volatilization rate compound, 1 g of γ-butyrolactone as a high volatilization rate compound, 1 g of 1,3,2-dioxathiolane-2,2-dioxide as a negative electrode protectant, 1 g of an ethylene oxide-propylene oxide copolymer having a molecular weight of 1,000,000 as a polymer, and 1 g of $LiBF_4$ as an ionic material, these materials were mixed inside a dry room controlled to a room temperature of 5° C. to obtain a homogeneous viscous electrolyte composition.

A lithium ion battery negative electrode was produced by carrying out the same operations as in Example 1 but by working in a quick manner.

There was faint odor of γ-butyrolactone in the air during work.

The work time was approximately 30 minutes, the weight of the obtained negative electrode, excluding the current collector, was 39.9 g, and weight loss had decreased significantly compared to in Comparative Example 5.

Comparative Example 6

A negative electrode for a lithium ion battery was produced by the same operations as in Example 1 with the exception that dimethyl sulfone was changed to dimethyl carbonate.

There was harsh odor of dimethyl carbonate in the air during work.

The work time was approximately 1 hour, the weight of the obtained negative electrode, excluding the current collector, was 38.0 g, and all of the dimethyl carbonate that had been added was judged to have volatilized in the production process.

Example 19

A lithium ion battery was produced in the same way as in Example 3 with the exception that work was carried out in an environment having a humidity of 5% (dew point: −13° C.) that was not a dry room.

Although operation of the battery was confirmed upon charging and discharging performed soon after production, the battery had a low discharge capacity maintenance rate of 50% after being cycled 10 times at 0.1 C in a voltage range of 4.2 V to 3.0 V.

Example 20

A positive electrode was produced in the same way as in Example 2 with the exception that work was carried out in an environment having a humidity of 5% (dew point: −13° C.) that was not a dry room.

The positive electrode was transferred to a dry room having a dew point of −40° C. Soon thereafter, lithium foil of 200 μm in thickness as a negative electrode having moisture trapping ability, a separator, and the positive electrode of the present example were stacked in order and were inserted into an aluminum laminate case. After 1 minute of degassing under vacuum, an edge of the aluminum laminate case was heat sealed to thereby produce a lithium ion battery. Operation of the battery was confirmed upon charging and discharging performed soon after production, and the battery had an improved discharge capacity maintenance rate of 90% after being cycled 10 times at 0.1 C in a voltage range of 4.2 V to 3.0 V.

Example 21

The positive electrode produced in Example 20 was transferred into a dry room and was left overnight at a location selected such that dry air flow was gently incident thereon with the aim of drying the positive electrode. The weight of the positive electrode after being left was 39.8 g, and slight weight loss occurred.

Next, lithium foil of 200 μm in thickness as a negative electrode having moisture trapping ability, a separator, and the positive electrode of the present example were stacked in order and were inserted into an aluminum laminate case. After 1 minute of degassing under vacuum, an edge of the aluminum laminate case was heat sealed to thereby produce a lithium ion battery. Operation of the battery was confirmed upon charging and discharging performed soon after production, and the battery had an improved discharge capacity maintenance rate of 95% after being cycled 10 times at 0.1 C in a voltage range of 4.2 V to 3.0 V.

Example 22

A lithium ion battery was produced in the same way as in Example 3 with the exception that 2% of lithium bis(oxalato)borate having moisture trapping ability was added as an ionic material. Operation of the battery was confirmed upon charging and discharging performed soon after production, and the battery had an improved discharge capacity maintenance rate of 99.5% after being cycled 10 times at 0.1 C in a voltage range of 4.2 V to 3.0 V. This is thought to be due to the oxalato borate structure of the bis(oxalato)borate anion having the ability to react with moisture and thereby trap water, and thus the same effect can be expected for a related difluoro(oxalato)borate salt.

Example 23

The positive electrode sandwiched between releasable PET films that was produced in Example 4 was punched out with a doughnut shape (outer diameter. 5 cm; inner diameter: 4 cm) by a punching die, aluminum foil as a current collector was also punched out with a larger size than this doughnut shape by 1 mm both inside and outside, and the punched-out positive electrode and aluminum foil were affixed to produce a positive electrode. A separator was punched out with a size larger than the positive electrode current collector by 2 mm both inside and outside and was further affixed, and then doughnut-shaped Li metal as a negative electrode was arranged so as to construct a battery. Casing was then performed using an aluminum laminate that had been punched out with a doughnut shape, and, in this manner, a lithium ion battery having a doughnut shape with an outer diameter of 7 cm and an inner diameter of 2 cm was obtained. It was also possible to produce lithium ion batteries of a FIG. 8 type, a star type, a letter S type, and so forth in the same manner. Note that end material resulting from punching can be returned in that form to a kneading step and be used as a material for a new electrode. Production of devices with shapes such as described above by conventional techniques is extremely difficult and would be uneconomical due to significant material waste even when possible.

Example 24

A positive electrode was produced in the same way as in Example 6 using foil obtained by coating a central section of aluminum foil of 10 cm in width with conductive carbon having a width of 6 cm and a thickness of 1 μm as a current collector. When the shaping material for an electrode was peeled from an edge thereof using a plastic spatula and was pulled up using tweezers, the shaping material for an electrode was smoothly peeled up to the boundary of the conductive carbon coating, and the shaping material for an electrode was torn cleanly along the boundary line. When peeling was subsequently carried out again for the shaping material for an electrode that was on the carbon coating using the plastic spatula, the shaping material for an electrode could be cleanly peeled off, though fairly strong force was required for this peeling. This demonstrates that adhesion between the shaping material for an electrode and the current collector is improved by performing carbon coating. This also demonstrates that it is possible to control a section where mounting of the shaping material for an electrode is desired and a section where mounting of the shaping material for an electrode is not desired through this treatment.

Example 25

A negative electrode was produced in the same way as in Example 2 with the exception that 25 g of lithium cobalt oxide was changed to 10 g of silicon having an average particle diameter of 10 μm. In the same way as in Example 2, the obtained negative electrode can be thinned without a support, and when the thickness thereof was adjusted to 200 μm, it was possible to pick up the negative electrode as a small piece of at least approximately 6 mm-square using tweezers while maintaining the shape thereof.

Example 26

A negative electrode was produced in the same way as in Example 25 with the exception that 10 g of silicon having an average particle diameter of 10 μm was changed to 10 g of silicon having an average particle diameter of 100 nm. In the same way as in Example 25, the obtained negative electrode can be thinned without a support, and when the thickness thereof was adjusted to 200 μm, it was possible to pick up the negative electrode as a small piece of at least approximately 20 mm-square using tweezers while maintaining the shape thereof, which demonstrates that strength of the negative electrode improved compared to Example 25. This is thought to be due to reduction of particle diameter increasing surfaces and increasing contact interfaces with the viscous electrolyte composition.

Example 27

After weighing out 5 g of succinonitrile, 2 g of dimethyl sulfone, 1 g of succinic anhydride, 1 g of an ethylene oxide-epichlorohydrin-allyl glycidyl ether random copolymer having a molecular weight of 500,000, and 1 g of $LiBF_4$, these materials were mixed at room temperature to obtain a homogeneous viscous electrolyte composition. The viscous electrolyte composition had an ion conductivity of $2.2 \times 10^{-3}$ S/cm. This viscous electrolyte composition could be used to form a shaping material for an electrode and be processed to obtain an electrode in the same way as in Example 1 or 2.

Example 28

After weighing out 6 g of ethylene carbonate, 2 g of dimethyl sulfone, 1 g of a homopolymer "BLEMMER® PME-400" (BLEMMER is a registered trademark in Japan, other countries, or both; methoxy polyethylene glycol-methacrylate having a 9-unit ethylene oxide chain at a side chain) having a molecular weight of 100,000, and 1 g of $LiBF_4$, these materials were mixed at room temperature to obtain a homogeneous viscous electrolyte composition. The viscous electrolyte composition had an ion conductivity of $5.2 \times 10^{-3}$ S/cm. This viscous electrolyte composition could be used to form a shaping material for an electrode and be processed to obtain an electrode in the same way as in Example 1 or 2.

Example 29

After weighing out 1 g of acrylic rubber (one-to-one copolymer of ethyl acrylate and butyl acrylate) having a molecular weight of 400,000, 4 g of ethylene carbonate, 4 g of succinonitrile, and 1 g of $LiPF_6$, these materials were mixed at room temperature to obtain a homogeneous viscous electrolyte composition. The viscous electrolyte composition had an ion conductivity of $6.0 \times 10^{-3}$ S/cm. This viscous electrolyte composition could be used to form a shaping material for an electrode and be processed to obtain an electrode in the same way as in Example 1 or 2.

Example 30

After weighing out 1 g of acrylic rubber (one-to-one copolymer of ethyl acrylate and butyl acrylate) having a molecular weight of 400,000, 4 g of ethylene carbonate, 2 g of succinonitrile, 1 g of dimethyl sulfone, and 3 g of magnesium bis(trifluoromethanesulfonyl)imide, these materials were mixed at room temperature to obtain a homogeneous viscous electrolyte composition. The viscous electrolyte composition had an ion conductivity of $3.6 \times 10^{-3}$ S/cm. This viscous electrolyte composition could be used to form a shaping material for an electrode and be processed to obtain an electrode in the same way as in Example 1 or 2.

Example 31

After weighing out 2 g of ethylene carbonate, 2 g of dimethyl sulfone, 2 g of diglycolic anhydride, 2 g of sulfolene, 1 g of polyethylene glycol (produced by Sigma-Aldrich) having a molecular weight of 1,000,000, and 1 g of lithium bis(trifluoromethanesulfonyl)imide, these materials were mixed at room temperature to obtain a homogeneous viscous electrolyte composition. The viscous electrolyte composition had an ion conductivity of $2.1 \times 10^{-3}$ S/cm. This viscous electrolyte composition could be used to form a shaping material for an electrode and be processed to obtain an electrode in the same way as in Example 1 or 2.

Comparative Example 7

After weighing out 4.5 g of ethylene carbonate, 4.5 g of propylene carbonate, 1 g of a polyvinylidene fluoride-hexafluoropropylene copolymer (produced by Sigma-Aldrich), and 3 g of lithium bis(trifluoromethanesulfonyl)imide, these materials were heated to 100° C. and were mixed to obtain a homogeneous electrolyte composition. When this electrolyte composition was cooled to room temperature, gelation occurred, and the resultant composition did not have viscosity. This is thought to be due to the polyvinylidene fluoride-hexafluoropropylene copolymer undergoing microscopic precipitation and becoming immiscible at room temperature. Graphite was added and then kneading thereof was performed in a mortar for processing in the same way as in Example 1, but processing was not possible because the material crumbled to pieces.

Example 32

Positive electrodes were produced in the same way as in Example 5 with the exception that the clearance of the die outlet was set as 200 μm, 500 μm, 1 mm, and 1 cm, respectively. The obtained positive electrodes respectively having thicknesses of 200 μm, 500 μm, 1 mm, and 1 cm could each be produced with a thickness accuracy of within ±1%. Moreover, the electrode density matched the calculated value well, and thus the obtained positive electrodes are thought to be dense electrodes without pores.

Example 33

A positive electrode was produced in the same way as in Example 6 with the exception that the aperture of the die outlet was set as 300 μm, the number of dies was set as 20, and the spacing was set as 4 mm. It was possible to produce a positive electrode having an average thickness of 32 μm with a thickness accuracy of 3%. The electrode density matched the calculated value well, and thus the obtained positive electrode is thought to be a dense electrode without pores.

Example 34

Li metal foil was affixed to the negative electrode of Example 1, and then the Li metal foil and the negative electrode were sealed inside aluminum laminate packing under vacuum. When the resultant product was stored in a 60° C. oven for 2 hours and was subsequently left at room temperature, the color of the negative electrode changed from black to gold. This indicates that the negative electrode graphite had been doped with Li metal, and thus demonstrates that the electrode can easily be pre-doped. Moreover, excess Li metal remaining after doping could easily be peeled from the negative electrode. When this pre-doped electrode was combined with an electrode having lithium titanate as an active material that had been separately produced in accordance with the present disclosure and when a battery was produced in accordance with Example 3, repeated charging and discharging was possible. Note that handling of this pre-doped negative electrode, inclusive of battery production, was carried out inside an argon glove box.

Experimental Example 1

A slurry was obtained by adding 40 g of dimethyl carbonate to the shaping material for an electrode of Example 2. With this slurry as an ink, an inkjet printer was used to form numerous dots of approximately 100 μm in diameter with gaps of approximately 1 mm in-between on aluminum foil of 1 cm×1 cm. The dimethyl carbonate was subsequently volatilized to form positive electrode dots having a dome shape. In addition, the upper part of each of the dots was flattened through stroking of the surface using a stainless steel spatula having a radius of curvature of 20 cm to thereby obtain a positive electrode. A separator cut out as 1.2 cm×1.2 mm was placed on this positive electrode, and lithium foil of 1 cm×1 cm was then placed thereon so as to form a lithium metal secondary battery. Good operation was confirmed upon charging and discharging performed soon thereafter.

Example 35

The clay-like electrode shaping materials for a positive electrode and a negative electrode that were obtained in Examples 1 and 2 were each placed inside an aluminum laminate zip bag that had been purged with argon, were heat sealed therein, and were stored at 25° C. Upon removal from the bags after 1 year, no change in terms of external appearance was observed in either case. Therefore, when a lithium ion battery was produced according to Examples 1 to 3 and was subjected to charging and discharging, the results did not change from those in Example 3. This demonstrates that the presently disclosed shaping material for an electrode has excellent preservability.

Example 36

A lithium ion battery having a configuration in which Celgard 2325 (produced by Polypore) was sandwiched between the negative electrode of Example 1 and the positive electrode of Example 2 and then the resultant product was enclosed in an aluminum laminate was produced. At this point, the Celgard was not wet. Although the electrical insulation resistance of the separator in the battery of Example 3 could not be measured because the battery was operated at the point at which it was produced, insulation resistance could be measured in the method of the present example. After measurement of insulation resistance, 1 M of $LiPF_6$ and ethylene carbonate/dimethyl carbonate (50:50) were injected as an electrolyte solution, and then heat sealing was performed. Operation of the battery was confirmed upon charging and discharging performed the next day. Either of the positive and negative electrodes in this case may alternatively be an electrode produced by an application method.

Example 37

A lithium ion battery having a configuration in which the positive electrode of Example 2, Celgard 2325 (produced by Polypore), and a metal Li negative electrode were combined and enclosed in an aluminum laminate was produced. Insulation resistance could also be measured for this battery. After measurement of insulation resistance, dimethyl carbonate was injected as a solvent, rather than an electrolyte solution, and then heat sealing was performed. Operation of the battery was confirmed upon charging and discharging performed the next day. It is thought that although the injected solvent did not contain a salt, lithium salt migrated from the positive electrode after injection, and thus lithium ions were also supplied to the separator section, thereby enabling operation of the battery. The negative electrode in this case may alternatively be an electrode produced by an application method. Since a solvent that does not contain a salt is injected, the solvent has low viscosity and thus is advantageous in terms of liquid circulation.

Example 38

A lithium ion battery was produced with a configuration in which a transparent film-like separator formed of an ethylene oxide-allyl glycidyl ether random copolymer (ethylene oxide:allyl glycidyl ether (molar ratio)=90:10) having a molecular weight of 1,000,000 that was obtained through UV irradiation and cross-linking with 1% of 2,2-dimethoxy-2-phenylacetophenone (produced by Wako Pure Chemical Industries, Ltd.) contained as a UV cross-linker, the positive electrode of Example 2, and a metal Li negative electrode were combined and enclosed in an aluminum laminate. Insulation resistance could also be measured for this battery. After measurement of insulation resistance, the battery was stored at 25° C. for 5 days. Operation of the battery was confirmed upon subsequently performed charging and discharging.

Example 39

With the exception that 50 mg of dicumyl peroxide was added as a thermal cross-linker to the viscous electrolyte composition of Example 1 and electrode heating was performed at 160° C. for 20 minutes, a 20 mm-square negative electrode in which the polymer had been cross-linked was produced in the same manner. This negative electrode could maintain the shape of a film without a support such as copper foil and could be picked up by tweezers, and thus had good handleability. During electrode heating, the electrode was sandwiched between copper foil at both sides so as to suppress volatilization of low molecular weight organic compound. However, once an electrode has been cross-linked, it is not possible to return the electrode to upstream in the process and recycle the electrode.

Example 40

After producing a shaping material for an electrode in the same way as in each of Examples 1 and 2, the shaping material for an electrode was broken up as finely as possible and was then moved onto a current collector.

The material was then carefully stretched using a hand roller while adjusting the applied force, and the thickness and thickness accuracy were controlled. In this manner, a positive electrode and a negative electrode having a higher porosity of 10 volume % than in Examples 1 and 2 were produced.

Similarly to in Examples 1 and 2, material loss was not observed during work.

When the positive electrode and the negative electrode were used to produce a battery in the same way as in Example 3, slight bubble release from the electrodes was observed at the point at which the electrodes and the separator were affixed. This is thought to be due to viscous electrolyte composition supplied from the separator causing air to be expelled from pores of the electrodes. This bubbling settled down within 5 seconds, and thus it was possible to push the released bubbles out of the electrodes and complete production of the battery. The initial irreversible capacity was 16% and the discharge capacity after 10 cycles was 99% of the initial discharge capacity.

Example 41

A positive electrode and a negative electrode having a porosity of 15 volume % were produced in the same way as in Example 40.

Similarly to in Example 40, material loss was not observed during work.

When the positive electrode and the negative electrode were used to produce a battery in the same way as in Example 3, bubble release from the electrodes was observed at the point at which the electrodes and the separator were affixed in the same way as in Example 40. This bubbling settled down within 10 seconds, and thus it was possible to push the released bubbles out of the electrodes and complete production of the battery. The initial irreversible capacity was 17% and the discharge capacity after 10 cycles was 99% of the initial discharge capacity.

Example 42

A positive electrode and a negative electrode having a porosity of 20 volume % were produced in the same way as in Example 40.

Similarly to in Example 40, material loss was not observed during work.

When the positive electrode and the negative electrode were used to produce a battery in the same way as in Example 3, bubble release from the electrodes was observed at the point at which the electrodes and the separator were affixed in the same way as in Example 40. This bubbling settled down within 30 seconds, and thus it was possible to push the released bubbles out of the electrodes and complete production of the battery. The initial irreversible capacity was 20% and the discharge capacity after 10 cycles was 95% of the initial discharge capacity.

This reduction of performance is thought to be caused by ion conduction and electron conduction being impaired and resistance inside the battery rising as a result of increased pores in the electrodes.

Example 43

A homogeneous clay-like shaping material for an electrode was obtained by kneading 5 mg of carbon nanotubes (CNTs) (ZEONANO SG101 produced by Zeon Nanotechnology Co., Ltd.; average diameter: 4 nm; average length: 400 μm; BET specific surface area: 1,150 m$^2$/g) as a fiber component that is electrically conductive and has a nanosize fiber diameter, 50 mg of ethylene carbonate, 100 mg of dimethyl sulfone, 10 mg of an ethylene oxide-propylene oxide copolymer having a molecular weight of 1,000,000, 10 mg of lithium bis(fluorosulfonyl)imide, and 1 g of lithium cobalt oxide in an open mortar.

This shaping material for an electrode can be thinned without a support, and when the shaped material for an electrode was used to form a sheet of 200 μm in thickness, it was possible to pick up the shaping material for an electrode as a small piece of at least approximately 3 cm-square using tweezers while maintaining the shape thereof. The strength of the electrode is thought to be high as a result of the inclusion of a fiber component. Also note that although fibers that were longer than the sheet thickness were included, the fibers did not appear to be protruding from the sheet.

Example 44

After weighing out 4 g of ethylene carbonate, 4 g of propylene carbonate, 1 g of an ethylene oxide-propylene oxide random copolymer (ethylene oxide:propylene oxide (molar ratio)=90:10) having a molecular weight of 1,000,000 as a polymer, and 1 g of lithium hexafluorophosphate as an ionic material, these materials were mixed at room temperature to obtain a homogeneous viscous electrolyte composition.

A homogeneous clay-like shaping material for an electrode was then obtained by kneading 1 g of the viscous electrolyte composition, 8 g of lithium cobalt oxide (CELLSEED C produced by Nippon Chemical Industrial Co., Ltd.; average particle diameter: 20 μm) as a positive electrode active material, 0.5 g of acetylene black as a conductive filler, and 0.08 g of PTFE as a fiber component in an open mortar. Another shaping material for an electrode was separately produced by reducing the amount of the viscous electrolyte composition to 0.8 g and further adding 0.5 g of Li$_2$O—Al$_2$O$_3$—SiO$_2$—P$_2$O$_5$—TiO$_2$ (Ion Conducting Glass produced by Ohara Corporation; average particle diameter: 1 μm; specific gravity: 2.8 g/cm$^3$) as an inorganic solid electrolyte so as to obtain two types of shaping materials for an electrode. The proportion in which the inorganic solid electrolyte (SE) was compounded relative to the total volume of the ionic material (S), the organic composition (P—O), and the inorganic solid electrolyte (SE) was 23 volume %.

Each of the shaping materials for an electrode can be thinned without a support. When the thickness was adjusted to 200 μm, the shaping material for an electrode in which the solid electrolyte had been added could be picked up as a small piece of approximately 6 cm-square using tweezers while maintaining the shape thereof.

The two types of shaping materials for an electrode were each used to produce a positive electrode of 80 μm in thickness and to construct a lithium ion battery by the same operations as in Examples 2 and 3. When these batteries were charged and discharged with a 0.2 C rate at 25° C. soon after production, a discharge capacity of 143 mAh/g relative to positive electrode weight was obtained in each case. Even when an inorganic solid electrolyte was used and the amount of an organic electrolyte was reduced, performance of an electrochemical device was not lost, and the safety of the production process and the electrochemical device could be increased as a result of the amount of combustible organic compound being reduced.

Example 45

After weighing out 4 g of ethylene carbonate, 4 g of propylene carbonate, 1 g of poly(2-ethyl-2-oxazoline) (produced by Sigma-Aldrich) having a molecular weight of 500,000 as a polymer, and 1 g of LiBF$_4$ as an ionic material, these materials were mixed at room temperature to obtain a homogeneous viscous electrolyte composition.

A composite electrolyte composition containing a viscous electrolyte composition and an inorganic solid electrolyte was then obtained by kneading 1 g of the viscous electrolyte composition, 5 g of Li$_2$O—Al$_2$O$_3$—SiO$_2$—P$_2$O$_5$—TiO$_2$ (Ion Conducting Glass produced by Ohara Corporation; average particle diameter: 1 μm; specific gravity: 2.8 g/cm$^3$) as an inorganic solid electrolyte, and 0.25 g of PTFE as a fiber component in an open mortar. The composite electrolyte composition was clay-like, had a cohesive nature, and could be shaped into the form of a sheet. In addition, 25 g of lithium cobalt oxide (CELLSEED C produced by Nippon Chemical Industrial Co., Ltd.; average particle diameter: 20 μm) as a positive electrode active material and 0.75 g of acetylene black as a conductive filler were added and kneaded with this composite electrolyte composition to obtain a homogeneous clay-like shaping material for an electrode. The proportion in which the inorganic solid electrolyte (SE) was compounded relative to the total volume of the ionic material (S), the organic composition (P—O), and the inorganic solid electrolyte (SE) was 72 volume %.

This shaping material for an electrode can be thinned without a support. When the thickness was adjusted to 200 μm, the shaping material for an electrode in which the solid electrolyte had been added could be picked up as a small piece of approximately 7 cm-square using tweezers while maintaining the shape thereof.

A positive electrode of 60 μm in thickness was produced and a lithium ion battery was constructed by the same operations as in Examples 2 and 3. When this battery was charged and discharged with a 0.05 C rate at 25° C. soon after production, a discharge capacity of 143 mAh/g relative to positive electrode weight was obtained.

INDUSTRIAL APPLICABILITY

According to the present disclosure, it is possible to provide a shaping material for an electrode that is easy to produce, in which the proportional content of an active material is easy to improve, and with which problems of odor and stability have a low tendency to occur.

Moreover, according to the present disclosure, it is possible to provide an electrode and an electrochemical device in which this shaping material for an electrode is used.

The invention claimed is:

1. A shaping material for an electrode comprising: at least one active material (A); and a viscous electrolyte composition, wherein
the viscous electrolyte composition contains: at least one ionic material(S); and an organic composition (P—O) containing at least one polymer (P) and a low molecular weight organic compound (O) having a molecular weight of less than 10,000,
a gel content of the polymer (P) is 20 mass % or less,
proportional content of the polymer (P) in the organic composition (P—O) is 50 mass % or less,
a proportion constituted by a compound having an equal or higher volatilization rate than N-methylpyrrolidone among the low molecular weight organic compound (O) is not less than 0 mass % and not more than 20 mass %,
proportional content of a compound that is a liquid at a temperature of 5° C. under atmospheric pressure in the organic composition (P—O) is not less than 0 mass % and not more than 20 mass %, and
the low molecular weight organic compound (O) includes at least two compounds each having a volatilization rate lower than N-methylpyrrolidone.

2. The shaping material for an electrode according to claim 1, further comprising a conductive filler.

3. The shaping material for an electrode according to claim 1, wherein proportional content of the active material (A) is 50 volume % or more.

4. The shaping material for an electrode according to claim 1, wherein proportional content of the active material (A) is 60 volume % or more.

5. The shaping material for an electrode according to claim 1, wherein the active material (A) is of a nanosize.

6. The shaping material for an electrode according to claim 1, further comprising a fiber component having a fiber diameter that is of a nanosize.

7. The shaping material for an electrode according to claim 1, wherein the viscous electrolyte composition has an ion conductivity at a temperature of 35° C. of $1.0 \times 10^{-4}$ S/cm or more.

8. The shaping material for an electrode according to claim 1, wherein the viscous electrolyte composition has an ion conductivity at a temperature of −20° C. of $1.0 \times 10^{-4}$ S/cm or more.

9. An electrode comprising a portion formed using the shaping material for an electrode according to claim 1.

10. The electrode according to claim 9, wherein the portion has a porosity of 20 volume % or less.

11. The electrode according to claim 9, obtained through film formation of the shaping material for an electrode in a sheet shape.

12. The electrode according to claim 9, obtained by affixing the shaping material for an electrode to a current collector.

13. The electrode according to claim 12, wherein the current collector includes a through hole at a site where the shaping material for an electrode is affixed.

14. The electrode according to claim 12, wherein the current collector has a conductive coating at a surface that is in contact with the shaping material for an electrode.

15. The electrode according to claim 9, wherein the shaping material for an electrode is cross-linked or polymerized.

16. A method of producing an electrode comprising a step of squashing a plurality of strands formed of the shaping material for an electrode according to claim 1 to shape the plurality of strands into a sheet shape.

17. A method of producing an electrode comprising a step of performing forming of the shaping material for an electrode according to claim 1 and subsequently affixing the shaping material for an electrode to a current collector.

18. A method of producing an electrode comprising a step of affixing the shaping material for an electrode according to claim 1 to both sides of a current collector.

19. A method of producing an electrode comprising a step of squashing the shaping material for an electrode according to claim 1 using a curved surface having a radius of curvature of 100 mm or less.

20. A method of producing an electrode comprising a step of paring the shaping material for an electrode according to claim 1 to adjust either or both of thickness and shape.

21. A method of producing an electrode comprising a step of performing rough adjustment of thickness of the shaping material for an electrode according to claim 1 and subsequently performing fine adjustment using a curved surface having a radius of curvature of 0.5 mm or more.

22. The method of producing an electrode according to claim 16, comprising a step of measuring thickness of the shaping material for an electrode and performing feedback control of basis weight of the shaping material for an electrode.

23. A method of recycling the electrode according to claim 12, comprising a step of peeling the shaping material for an electrode from the current collector.

24. An electrochemical device comprising the electrode according to claim 9.

25. The electrochemical device according to claim 24, wherein a counter electrode of the electrode is formed of at least one selected from an alkali metal, an alkaline earth metal, and metal aluminum.

26. The electrochemical device according to claim 24, wherein either or both of a counter electrode of the electrode and a separator contain an inorganic filler having moisture trapping ability.

27. The electrochemical device according to claim 24, wherein either or both of a counter electrode of the electrode and a separator contain an ionic material having moisture trapping ability.

* * * * *